US008521880B1

(12) United States Patent
Richardson et al.

(10) Patent No.: US 8,521,880 B1
(45) Date of Patent: Aug. 27, 2013

(54) MANAGING CONTENT DELIVERY NETWORK SERVICE PROVIDERS

(75) Inventors: David R. Richardson, Seattle, WA (US); Bradley E. Marshall, Bainbridge Island, WA (US); Swaminathan Sivasubramanian, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 591 days.

(21) Appl. No.: 12/272,681

(22) Filed: Nov. 17, 2008

(51) Int. Cl.
*G06F 15/16* (2006.01)

(52) U.S. Cl.
USPC .................... 709/226; 709/223; 705/500

(58) Field of Classification Search
USPC .................... 709/220, 223, 226; 705/500
See application file for complete search history.

(56) References Cited

U.S. PATENT DOCUMENTS

| | | | |
|---|---|---|---|
| 5,341,477 A | 8/1994 | Pitkin et al. | |
| 5,611,049 A | 3/1997 | Pitts | |
| 5,774,660 A | 6/1998 | Brendel et al. | |
| 5,892,914 A | 4/1999 | Pitts | |
| 6,016,512 A | 1/2000 | Huitema | |
| 6,026,452 A | 2/2000 | Pitts | |
| 6,052,718 A | 4/2000 | Gifford | |
| 6,085,234 A | 7/2000 | Pitts et al. | |
| 6,098,096 A | 8/2000 | Tsirigotis et al. | |
| 6,108,703 A | 8/2000 | Leighton et al. | |
| 6,182,111 B1 | 1/2001 | Inohara et al. | |
| 6,185,598 B1 | 2/2001 | Farber et al. | |
| 6,192,051 B1 | 2/2001 | Lipman et al. | |
| 6,205,475 B1 | 3/2001 | Pitts | |
| 6,275,496 B1 | 8/2001 | Burns et al. | |
| 6,286,043 B1 | 9/2001 | Cuomo et al. | |
| 6,286,084 B1 | 9/2001 | Wexler et al. | |
| 6,304,913 B1 | 10/2001 | Rune | |
| 6,351,743 B1 | 2/2002 | DeArdo et al. | |
| 6,351,775 B1 | 2/2002 | Yu | |
| 6,363,411 B1 | 3/2002 | Dugan et al. | |
| 6,366,952 B2 | 4/2002 | Pitts | |
| 6,374,290 B1 | 4/2002 | Scharber et al. | |
| 6,415,280 B1 | 7/2002 | Farber et al. | |
| 6,457,047 B1 | 9/2002 | Chandra et al. | |

(Continued)

FOREIGN PATENT DOCUMENTS

| | | |
|---|---|---|
| CN | 1422468 A | 6/2003 |
| CN | 101189598 A | 5/2008 |
| WO | WO 2007/007960 A1 | 1/2007 |
| WO | WO 2012/044587 A1 | 4/2012 |

OTHER PUBLICATIONS

International Search Report and Written Opinion in PCT/US2011/053302 mailed Nov. 28, 2011 in 11 pages.

(Continued)

*Primary Examiner* — El Hadji Sall
(74) *Attorney, Agent, or Firm* — Knobbe, Martens, Olson & Bear, LLP

(57) ABSTRACT

A system, method, and computer readable medium for managing CDN service providers are provided. A network storage provider storing one or more resources on behalf of a content provider obtains client computing device requests for content. The network storage provider updates request processing information based on the process requests for content. The network storage provider then makes a recommendation regarding initialization of a CDN service provider as a function of the updated request processing information. Subsequent client computing device requests for resources can be provided to the recommended CDN service provider utilizing alternative resource identifiers.

25 Claims, 14 Drawing Sheets

(56) References Cited

U.S. PATENT DOCUMENTS

| | | |
|---|---|---|
| 6,484,143 B1 | 11/2002 | Swildens et al. |
| 6,505,241 B2 | 1/2003 | Pitts |
| 6,553,413 B1 | 4/2003 | Leighton et al. |
| 6,560,610 B1 | 5/2003 | Eatherton et al. |
| 6,611,873 B1 | 8/2003 | Kanehara |
| 6,654,807 B2 | 11/2003 | Farber et al. |
| 6,658,462 B1 | 12/2003 | Dutta |
| 6,678,791 B1 | 1/2004 | Jacobs et al. |
| 6,694,358 B1 | 2/2004 | Swildens et al. |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,769,031 B1 | 7/2004 | Bero |
| 6,785,704 B1 | 8/2004 | McCanne |
| 6,804,706 B2 | 10/2004 | Pitts |
| 6,829,654 B1 | 12/2004 | Jungck |
| 6,874,017 B1 | 3/2005 | Inoue et al. |
| 6,963,850 B1 | 11/2005 | Bezos et al. |
| 6,981,017 B1 | 12/2005 | Kasriel et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 * | 3/2006 | Lewin et al. .................. 709/217 |
| 7,010,598 B2 | 3/2006 | Sitaraman et al. |
| 7,032,010 B1 | 4/2006 | Swildens et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,103,645 B2 | 9/2006 | Leighton et al. |
| 7,117,262 B2 | 10/2006 | Bai et al. |
| 7,133,905 B2 | 11/2006 | Dilley et al. |
| 7,143,169 B1 | 11/2006 | Champagne et al. |
| 7,149,809 B2 | 12/2006 | Barde et al. |
| 7,152,118 B2 | 12/2006 | Anderson, IV et al. |
| 7,174,382 B2 | 2/2007 | Ramanathan et al. |
| 7,185,063 B1 | 2/2007 | Kasriel et al. |
| 7,188,214 B1 | 3/2007 | Kasriel et al. |
| 7,194,522 B1 | 3/2007 | Swildens et al. |
| 7,200,667 B2 | 4/2007 | Teodosiu et al. |
| 7,225,254 B1 | 5/2007 | Swildens et al. |
| 7,228,350 B2 | 6/2007 | Hong et al. |
| 7,233,978 B2 | 6/2007 | Overton et al. |
| 7,240,100 B1 | 7/2007 | Wein et al. |
| 7,254,636 B1 | 8/2007 | O'Toole, Jr. et al. |
| 7,260,598 B1 | 8/2007 | Liskov et al. |
| 7,269,784 B1 | 9/2007 | Kasriel et al. |
| 7,289,519 B1 | 10/2007 | Liskov |
| 7,293,093 B2 | 11/2007 | Leighton |
| 7,310,686 B2 | 12/2007 | Uysal |
| 7,316,648 B2 | 1/2008 | Kelly et al. |
| 7,321,918 B2 | 1/2008 | Burd et al. |
| 7,363,291 B1 | 4/2008 | Page |
| 7,441,045 B2 | 10/2008 | Skene et al. |
| 7,461,170 B1 | 12/2008 | Taylor et al. |
| 7,464,142 B2 | 12/2008 | Flurry et al. |
| 7,492,720 B2 | 2/2009 | Pruthi et al. |
| 7,499,998 B2 | 3/2009 | Toebes et al. |
| 7,502,836 B1 | 3/2009 | Menditto et al. |
| 7,519,720 B2 | 4/2009 | Fishman et al. |
| 7,552,235 B2 | 6/2009 | Chase et al. |
| 7,565,407 B1 | 7/2009 | Hayball |
| 7,573,916 B1 | 8/2009 | Bechtolsheim et al. |
| 7,650,376 B1 | 1/2010 | Blumenau |
| 7,653,700 B1 | 1/2010 | Bahl et al. |
| 7,680,897 B1 | 3/2010 | Carter et al. |
| 7,706,740 B2 | 4/2010 | Collins et al. |
| 7,707,314 B2 | 4/2010 | McCarthy et al. |
| 7,716,367 B1 | 5/2010 | Leighton et al. |
| 7,725,602 B2 | 5/2010 | Liu et al. |
| 7,747,720 B2 | 6/2010 | Toebes et al. |
| 7,761,572 B1 | 7/2010 | Auerbach |
| 7,769,823 B2 | 8/2010 | Jenny et al. |
| 7,773,596 B1 | 8/2010 | Marques |
| 7,774,342 B1 | 8/2010 | Virdy |
| 7,792,989 B2 | 9/2010 | Toebes et al. |
| 7,809,597 B2 | 10/2010 | Das et al. |
| 7,813,308 B2 | 10/2010 | Reddy et al. |
| 7,818,454 B2 | 10/2010 | Kim et al. |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,427 B2 | 4/2011 | Josefsberg et al. |
| 7,937,477 B1 | 5/2011 | Day et al. |
| 7,949,779 B2 | 5/2011 | Farber et al. |
| 7,962,597 B2 | 6/2011 | Richardson et al. |
| 7,966,404 B2 | 6/2011 | Hedin et al. |
| 7,979,509 B1 | 7/2011 | Malmskog et al. |
| 7,991,910 B2 | 8/2011 | Richardson et al. |
| 7,996,535 B2 | 8/2011 | Auerbach |
| 8,000,724 B1 | 8/2011 | Rayburn et al. |
| 8,028,090 B2 | 9/2011 | Richardson et al. |
| 8,065,275 B2 | 11/2011 | Eriksen et al. |
| 8,073,940 B1 | 12/2011 | Richardson et al. |
| 8,082,348 B1 | 12/2011 | Averbuj et al. |
| 8,117,306 B1 | 2/2012 | Baumback et al. |
| 8,122,098 B1 | 2/2012 | Richardson et al. |
| 8,321,568 B2 | 11/2012 | Sivasubramanian et al. |
| 2001/0032133 A1 | 10/2001 | Moran |
| 2001/0049741 A1 | 12/2001 | Skene et al. |
| 2001/0056416 A1 | 12/2001 | Garcia-Luna-Aceves |
| 2002/0007413 A1 | 1/2002 | Garcia-Luna-Aceves et al. |
| 2002/0052942 A1 | 5/2002 | Swildens et al. |
| 2002/0068554 A1 | 6/2002 | Dusse |
| 2002/0069420 A1 | 6/2002 | Russell et al. |
| 2002/0083118 A1 | 6/2002 | Sim |
| 2002/0083148 A1 | 6/2002 | Shaw et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0107944 A1 | 8/2002 | Bai et al. |
| 2002/0116481 A1 | 8/2002 | Lee |
| 2002/0124098 A1 | 9/2002 | Shaw |
| 2002/0138286 A1 | 9/2002 | Engstrom |
| 2002/0138437 A1 | 9/2002 | Lewin et al. |
| 2002/0143989 A1 | 10/2002 | Huitema et al. |
| 2002/0147770 A1 | 10/2002 | Tang |
| 2002/0156911 A1 | 10/2002 | Croman et al. |
| 2002/0161767 A1 | 10/2002 | Shapiro et al. |
| 2002/0163882 A1 | 11/2002 | Bornstein et al. |
| 2002/0188722 A1 | 12/2002 | Banerjee et al. |
| 2003/0002484 A1 | 1/2003 | Freedman |
| 2003/0009591 A1 | 1/2003 | Hayball et al. |
| 2003/0033283 A1 | 2/2003 | Evans et al. |
| 2003/0065739 A1 | 4/2003 | Shnier |
| 2003/0099202 A1 | 5/2003 | Lear et al. |
| 2003/0101278 A1 | 5/2003 | Garcia-Luna-Aceves et al. |
| 2003/0120741 A1 | 6/2003 | Wu et al. |
| 2003/0135509 A1 | 7/2003 | Davis et al. |
| 2003/0145066 A1 | 7/2003 | Okada et al. |
| 2003/0149581 A1 | 8/2003 | Chaudhri et al. |
| 2003/0163722 A1 | 8/2003 | Anderson, IV |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0182413 A1 | 9/2003 | Allen et al. |
| 2003/0187935 A1 | 10/2003 | Agarwalla et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0229682 A1 | 12/2003 | Day |
| 2003/0233423 A1 | 12/2003 | Dilley et al. |
| 2004/0010621 A1 | 1/2004 | Afergan et al. |
| 2004/0019518 A1 | 1/2004 | Abraham et al. |
| 2004/0024841 A1 | 2/2004 | Becker et al. |

| | | | | | |
|---|---|---|---|---|---|
| 2004/0030620 A1 | 2/2004 | Benjamin et al. | 2007/0041393 A1 | 2/2007 | Westhead et al. |
| 2004/0034744 A1 | 2/2004 | Karlsson et al. | 2007/0043859 A1 | 2/2007 | Ruul |
| 2004/0039798 A1 | 2/2004 | Hotz et al. | 2007/0050522 A1 | 3/2007 | Grove et al. |
| 2004/0044791 A1 | 3/2004 | Pouzzner | 2007/0055764 A1 | 3/2007 | Dilley et al. |
| 2004/0064501 A1 | 4/2004 | Jan et al. | 2007/0076872 A1 | 4/2007 | Juneau |
| 2004/0073596 A1 | 4/2004 | Kloninger et al. | 2007/0094361 A1 | 4/2007 | Hoynowski et al. |
| 2004/0073867 A1 | 4/2004 | Kausik et al. | 2007/0101377 A1 | 5/2007 | Six et al. |
| 2004/0078468 A1 | 4/2004 | Hedin et al. | 2007/0118667 A1 | 5/2007 | McCarthy et al. |
| 2004/0078487 A1 | 4/2004 | Cernohous et al. | 2007/0118668 A1 | 5/2007 | McCarthy et al. |
| 2004/0083307 A1 | 4/2004 | Uysal | 2007/0134641 A1 | 6/2007 | Lieu |
| 2004/0117455 A1 | 6/2004 | Kaminsky et al. | 2007/0168517 A1 | 7/2007 | Weller et al. |
| 2004/0128344 A1 | 7/2004 | Trossen | 2007/0174426 A1 | 7/2007 | Swildens et al. |
| 2004/0128346 A1 | 7/2004 | Melamed et al. | 2007/0174442 A1 | 7/2007 | Sherman et al. |
| 2004/0167981 A1 | 8/2004 | Douglas et al. | 2007/0174490 A1 | 7/2007 | Choi et al. |
| 2004/0172466 A1 | 9/2004 | Douglas et al. | 2007/0208737 A1 | 9/2007 | Li et al. |
| 2004/0194085 A1 | 9/2004 | Beaubien et al. | 2007/0219795 A1 | 9/2007 | Park et al. |
| 2004/0203630 A1 | 10/2004 | Wang | 2007/0220010 A1 | 9/2007 | Ertugrul |
| 2004/0205149 A1 | 10/2004 | Dillon et al. | 2007/0244964 A1 | 10/2007 | Challenger et al. |
| 2004/0205162 A1 | 10/2004 | Parikh | 2007/0250467 A1 | 10/2007 | Mesnik et al. |
| 2004/0215823 A1 | 10/2004 | Kleinfelter et al. | 2007/0250560 A1 | 10/2007 | Wein et al. |
| 2004/0249971 A1 | 12/2004 | Klinker | 2007/0253377 A1 | 11/2007 | Janneteau et al. |
| 2004/0249975 A1 | 12/2004 | Tuck et al. | 2007/0266113 A1 | 11/2007 | Koopmans et al. |
| 2004/0267906 A1 | 12/2004 | Truty | 2007/0266311 A1 | 11/2007 | Westphal |
| 2004/0267907 A1 | 12/2004 | Gustafsson | 2007/0266333 A1 | 11/2007 | Cossey et al. |
| 2005/0010653 A1 | 1/2005 | McCanne | 2007/0271385 A1 | 11/2007 | Davis et al. |
| 2005/0021706 A1 | 1/2005 | Maggi et al. | 2007/0280229 A1 | 12/2007 | Kenney |
| 2005/0108529 A1 | 5/2005 | Juneau | 2007/0288588 A1 | 12/2007 | Wein et al. |
| 2005/0114296 A1 | 5/2005 | Farber et al. | 2008/0005057 A1 | 1/2008 | Ozzie et al. |
| 2005/0132083 A1 | 6/2005 | Raciborski et al. | 2008/0008089 A1 | 1/2008 | Bornstein et al. |
| 2005/0157712 A1 | 7/2005 | Rangarajan et al. | 2008/0025304 A1 | 1/2008 | Venkataswami et al. |
| 2005/0163168 A1 | 7/2005 | Sheth et al. | 2008/0046596 A1 | 2/2008 | Afergan et al. |
| 2005/0171959 A1 | 8/2005 | Deforche et al. | 2008/0065724 A1 | 3/2008 | Seed et al. |
| 2005/0188073 A1* | 8/2005 | Nakamichi et al. ............ 709/223 | 2008/0065745 A1 | 3/2008 | Leighton et al. |
| 2005/0216569 A1 | 9/2005 | Coppola et al. | 2008/0071859 A1 | 3/2008 | Seed et al. |
| 2005/0216674 A1 | 9/2005 | Robbin et al. | 2008/0071987 A1 | 3/2008 | Karn et al. |
| 2005/0259672 A1 | 11/2005 | Eduri | 2008/0082551 A1 | 4/2008 | Farber et al. |
| 2005/0262248 A1 | 11/2005 | Jennings, III et al. | 2008/0086574 A1 | 4/2008 | Raciborski et al. |
| 2005/0267991 A1 | 12/2005 | Huitema et al. | 2008/0103805 A1 | 5/2008 | Shear et al. |
| 2005/0267992 A1 | 12/2005 | Huitema et al. | 2008/0104268 A1 | 5/2008 | Farber et al. |
| 2005/0267993 A1 | 12/2005 | Huitema et al. | 2008/0114829 A1 | 5/2008 | Button et al. |
| 2005/0278259 A1 | 12/2005 | Gunaseelan et al. | 2008/0134043 A1* | 6/2008 | Georgis et al. ................ 715/733 |
| 2006/0013158 A1 | 1/2006 | Ahuja et al. | 2008/0147866 A1* | 6/2008 | Stolorz et al. ................ 709/226 |
| 2006/0020596 A1 | 1/2006 | Liu et al. | 2008/0147873 A1 | 6/2008 | Matsumoto |
| 2006/0020684 A1 | 1/2006 | Mukherjee et al. | 2008/0155614 A1 | 6/2008 | Cooper et al. |
| 2006/0020715 A1 | 1/2006 | Jungck | 2008/0172488 A1 | 7/2008 | Jawahar et al. |
| 2006/0026154 A1 | 2/2006 | Altinel et al. | 2008/0189437 A1 | 8/2008 | Halley |
| 2006/0036720 A1 | 2/2006 | Faulk, Jr. | 2008/0201332 A1 | 8/2008 | Souders et al. |
| 2006/0037037 A1 | 2/2006 | Miranz | 2008/0215718 A1 | 9/2008 | Stolorz et al. |
| 2006/0041614 A1 | 2/2006 | Oe | 2008/0215735 A1 | 9/2008 | Farber et al. |
| 2006/0047787 A1 | 3/2006 | Agarwal et al. | 2008/0215750 A1 | 9/2008 | Farber et al. |
| 2006/0063534 A1 | 3/2006 | Kokkonen et al. | 2008/0222281 A1 | 9/2008 | Dilley et al. |
| 2006/0064500 A1 | 3/2006 | Roth et al. | 2008/0222291 A1 | 9/2008 | Weller et al. |
| 2006/0074750 A1 | 4/2006 | Clark et al. | 2008/0222295 A1 | 9/2008 | Robinson et al. |
| 2006/0075084 A1 | 4/2006 | Lyon | 2008/0228920 A1 | 9/2008 | Souders et al. |
| 2006/0075139 A1 | 4/2006 | Jungck | 2008/0235400 A1 | 9/2008 | Slocombe et al. |
| 2006/0112176 A1 | 5/2006 | Liu et al. | 2008/0281950 A1 | 11/2008 | Wald et al. |
| 2006/0120385 A1 | 6/2006 | Atchison et al. | 2008/0288722 A1 | 11/2008 | Lecoq et al. |
| 2006/0143293 A1 | 6/2006 | Freedman | 2008/0301670 A1 | 12/2008 | Gouge et al. |
| 2006/0155823 A1 | 7/2006 | Tran et al. | 2008/0319862 A1 | 12/2008 | Golan et al. |
| 2006/0161541 A1 | 7/2006 | Cencini | 2009/0029644 A1 | 1/2009 | Sue et al. |
| 2006/0168088 A1 | 7/2006 | Leighton et al. | 2009/0031367 A1 | 1/2009 | Sue |
| 2006/0193247 A1 | 8/2006 | Naseh et al. | 2009/0031368 A1 | 1/2009 | Ling |
| 2006/0195866 A1 | 8/2006 | Thukral | 2009/0031376 A1 | 1/2009 | Riley et al. |
| 2006/0218304 A1 | 9/2006 | Mukherjee et al. | 2009/0049098 A1 | 2/2009 | Pickelsimer et al. |
| 2006/0227740 A1 | 10/2006 | McLaughlin et al. | 2009/0070533 A1 | 3/2009 | Elazary et al. |
| 2006/0230137 A1 | 10/2006 | Gare et al. | 2009/0086741 A1 | 4/2009 | Zhang |
| 2006/0233155 A1 | 10/2006 | Srivastava | 2009/0103707 A1 | 4/2009 | McGary et al. |
| 2006/0253546 A1 | 11/2006 | Chang et al. | 2009/0112703 A1 | 4/2009 | Brown |
| 2006/0253609 A1 | 11/2006 | Andreev et al. | 2009/0125934 A1* | 5/2009 | Jones et al. ..................... 725/28 |
| 2006/0259690 A1 | 11/2006 | Vittal et al. | 2009/0132368 A1 | 5/2009 | Cotter et al. |
| 2006/0259984 A1 | 11/2006 | Juneau | 2009/0132648 A1 | 5/2009 | Swildens et al. |
| 2006/0265508 A1 | 11/2006 | Angel et al. | 2009/0144412 A1 | 6/2009 | Ferguson et al. |
| 2006/0265516 A1 | 11/2006 | Schilling | 2009/0150926 A1 | 6/2009 | Schlack |
| 2006/0282522 A1 | 12/2006 | Lewin et al. | 2009/0157850 A1 | 6/2009 | Gagliardi et al. |
| 2007/0005689 A1 | 1/2007 | Leighton et al. | 2009/0158163 A1 | 6/2009 | Stephens et al. |
| 2007/0005892 A1 | 1/2007 | Mullender et al. | 2009/0177667 A1 | 7/2009 | Ramos et al. |
| 2007/0011267 A1 | 1/2007 | Overton et al. | 2009/0182815 A1 | 7/2009 | Czechowski et al. |
| 2007/0014241 A1 | 1/2007 | Banerjee et al. | 2009/0187575 A1 | 7/2009 | DaCosta |
| 2007/0038994 A1 | 2/2007 | Davis et al. | 2009/0204682 A1 | 8/2009 | Jeyaseelan et al. |

| | | |
|---|---|---|
| 2009/0210549 A1 | 8/2009 | Hudson et al. |
| 2009/0248786 A1* | 10/2009 | Richardson et al. .......... 709/201 |
| 2009/0248852 A1 | 10/2009 | Fuhrmann et al. |
| 2009/0248893 A1* | 10/2009 | Richardson et al. .......... 709/239 |
| 2009/0259971 A1 | 10/2009 | Rankine et al. |
| 2009/0271577 A1 | 10/2009 | Campana et al. |
| 2009/0271730 A1 | 10/2009 | Rose et al. |
| 2009/0287750 A1 | 11/2009 | Banavar et al. |
| 2009/0307307 A1 | 12/2009 | Igarashi |
| 2009/0327517 A1* | 12/2009 | Sivasubramanian et al. . 709/238 |
| 2010/0005175 A1 | 1/2010 | Swildens et al. |
| 2010/0011061 A1 | 1/2010 | Hudson et al. |
| 2010/0030662 A1 | 2/2010 | Klein |
| 2010/0070603 A1 | 3/2010 | Moss et al. |
| 2010/0088367 A1 | 4/2010 | Brown et al. |
| 2010/0100629 A1 | 4/2010 | Raciborski et al. |
| 2010/0111059 A1 | 5/2010 | Bappu et al. |
| 2010/0121953 A1 | 5/2010 | Friedman et al. |
| 2010/0122069 A1 | 5/2010 | Gonion |
| 2010/0150155 A1 | 6/2010 | Napierala |
| 2010/0192225 A1 | 7/2010 | Ma et al. |
| 2010/0217801 A1 | 8/2010 | Leighton et al. |
| 2010/0257566 A1 | 10/2010 | Matila |
| 2010/0293479 A1 | 11/2010 | Rousso et al. |
| 2010/0299439 A1 | 11/2010 | McCarthy et al. |
| 2010/0332595 A1 | 12/2010 | Fullagar et al. |
| 2011/0040893 A1 | 2/2011 | Karaoguz et al. |
| 2011/0078000 A1 | 3/2011 | Ma et al. |
| 2011/0078230 A1 | 3/2011 | Sepulveda |
| 2011/0153941 A1 | 6/2011 | Spatscheck et al. |
| 2011/0238501 A1 | 9/2011 | Almeida |
| 2011/0252142 A1 | 10/2011 | Richardson et al. |
| 2011/0258049 A1 | 10/2011 | Ramer et al. |
| 2011/0276623 A1 | 11/2011 | Girbal |
| 2012/0066360 A1 | 3/2012 | Ghosh |
| 2012/0179839 A1 | 7/2012 | Raciborski et al. |

OTHER PUBLICATIONS

Singapore Written Opinion in Application No. 201006836-9, mailed Oct. 12, 2011 in 12 pages.

Singapore Written Opinion in Application No. 201006837-7, mailed Oct. 12, 2011 in 11 pages.

Singapore Written Opinion in Application No. 201006874-0, mailed Oct. 12, 2011 in 10 pages.

American Bar Association; Digital Signature Guidelines Tutorial [online]; Feb. 10, 2002 [retrived on Mar. 2, 2010]; American Bar Association Section of Science and Technology Information Security Committee; Retrieved from the internet: <URL: http://web.archive.org/web/20020210124615/www.abanet.org/scitech/ec/isc/dsg-tutorial.html; pp. 1-8.

Singapore Examination Report in Application No. 201006837-7 mailed May 16, 2012.

Baglioni et al., "Preprocessing and Mining Web Log Data for Web Personalization", LNAI 2829, 2003, pp. 237-249.

Liu et al., "Combined mining of Web server logs and web contents for classifying user navigation patterns and predicting users' future requests," Data & Knowledge Engineering 61 (2007) pp. 304-330.

Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.

Xu et al., "Decision tree regression for soft classification of remote sensing data", Remote Sensing of Environment 97 (2005) pp. 322-336.

International Search Report and Written Opinion in PCT/US2011/061486 mailed Mar. 30, 2012 in 11 pages.

Supplementary European Search Report in Application No. 09727694.3 mailed Jan. 30, 2012 in 6 pages.

First Office Action in Chinese Application No. 200980145872.4 dated Nov. 29, 2012.

Search Report and Written Opinion in Singapore Application No. 201103333-9 mailed Nov. 19, 2012.

Singapore Written Opinion in Application No. 201006836-9, mailed Apr. 30, 2012 in 10 pages.

First Office Action in Chinese Application No. 200980119993.1 dated Jul. 4, 2012.

First Office Action in Chinese Application No. 200980119995.0 dated Jul. 6, 2012.

* cited by examiner

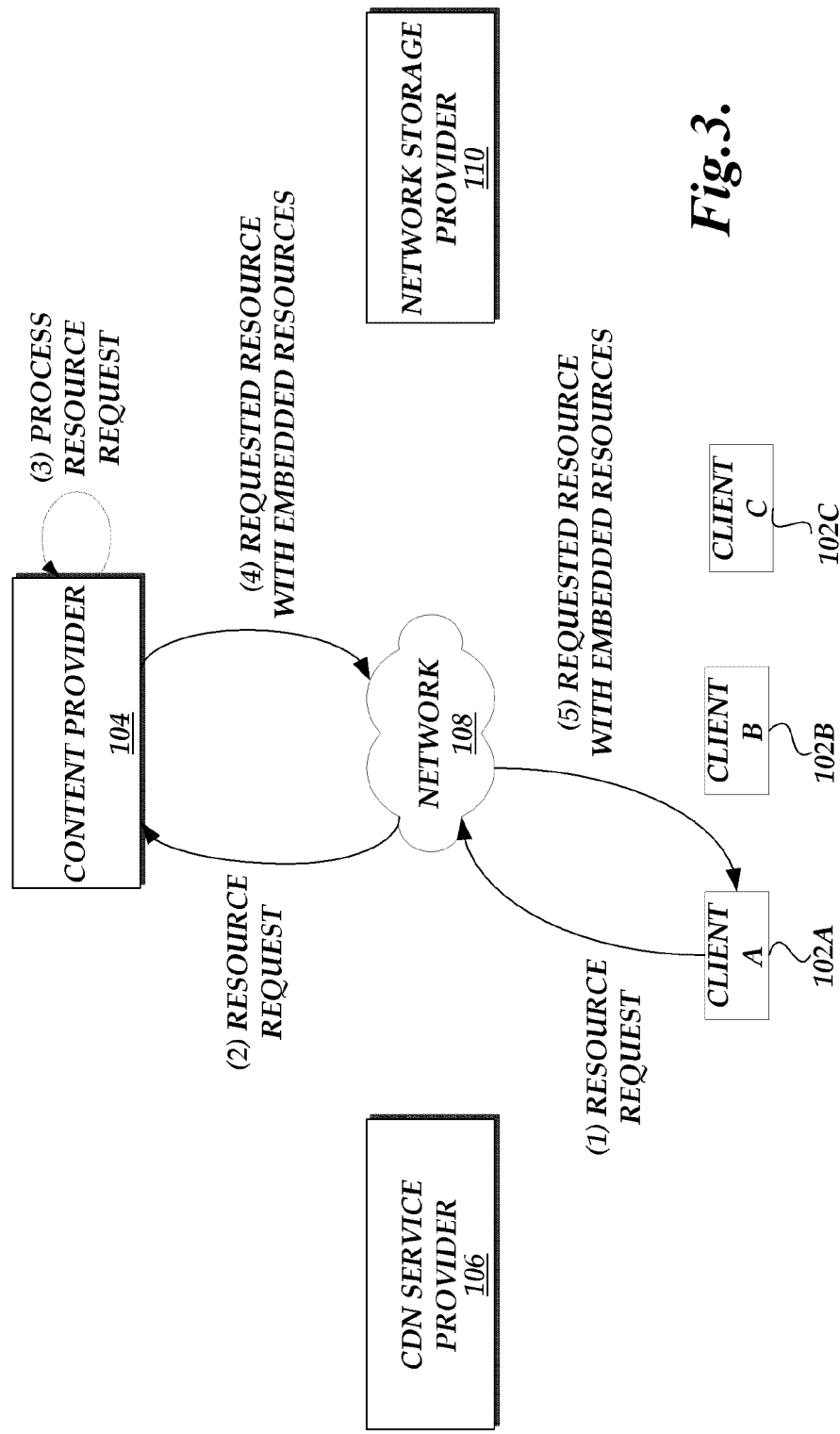

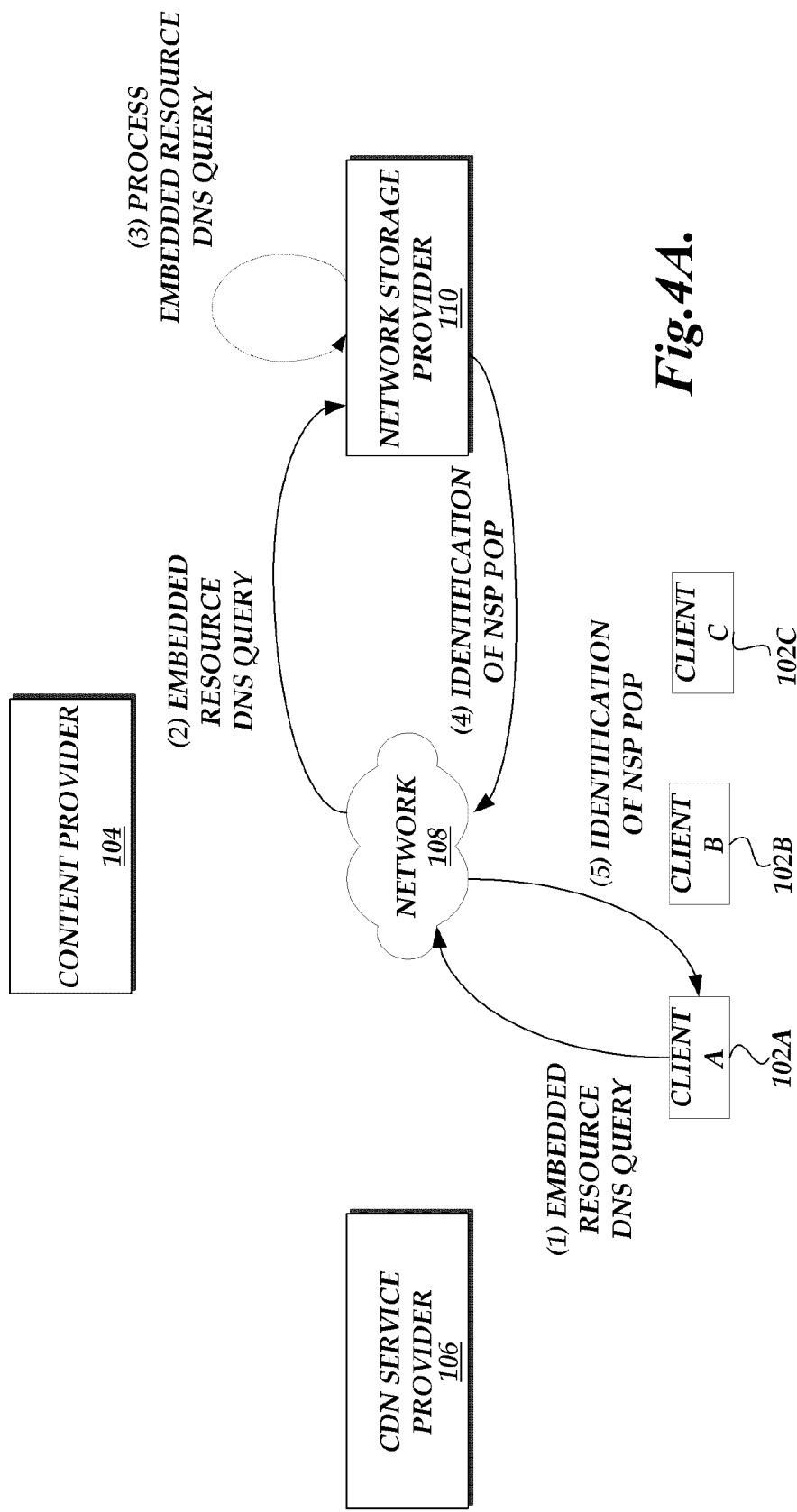

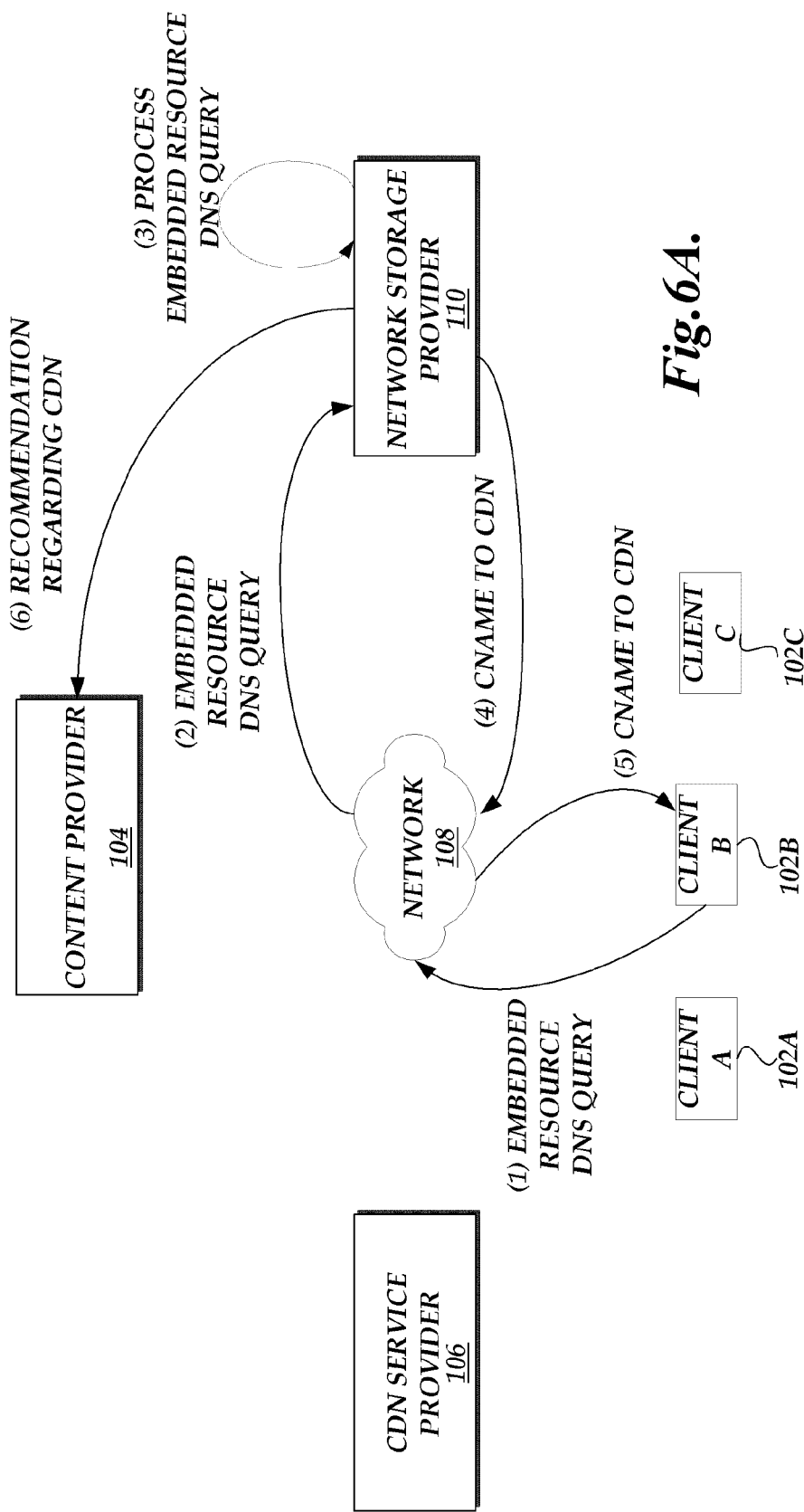

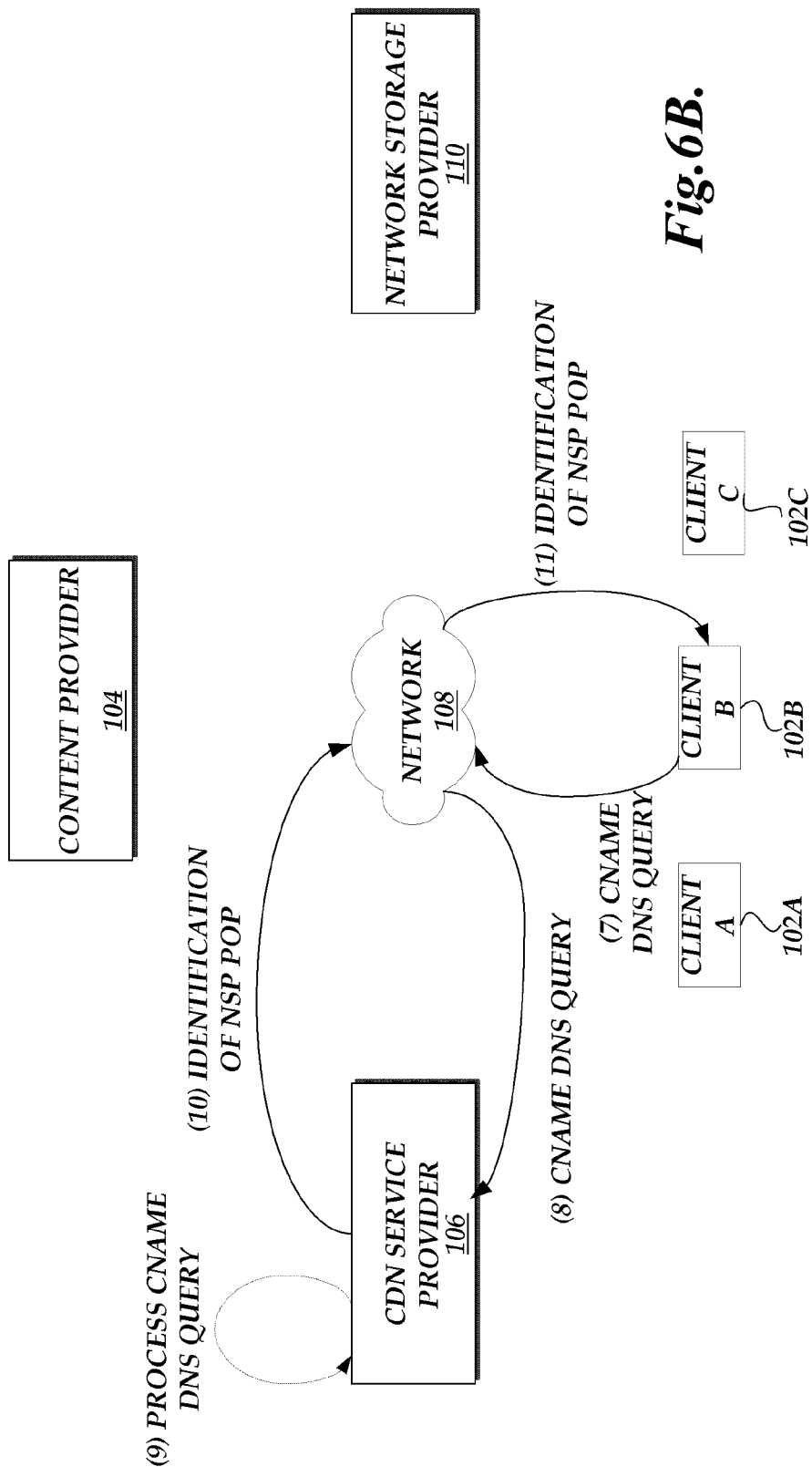

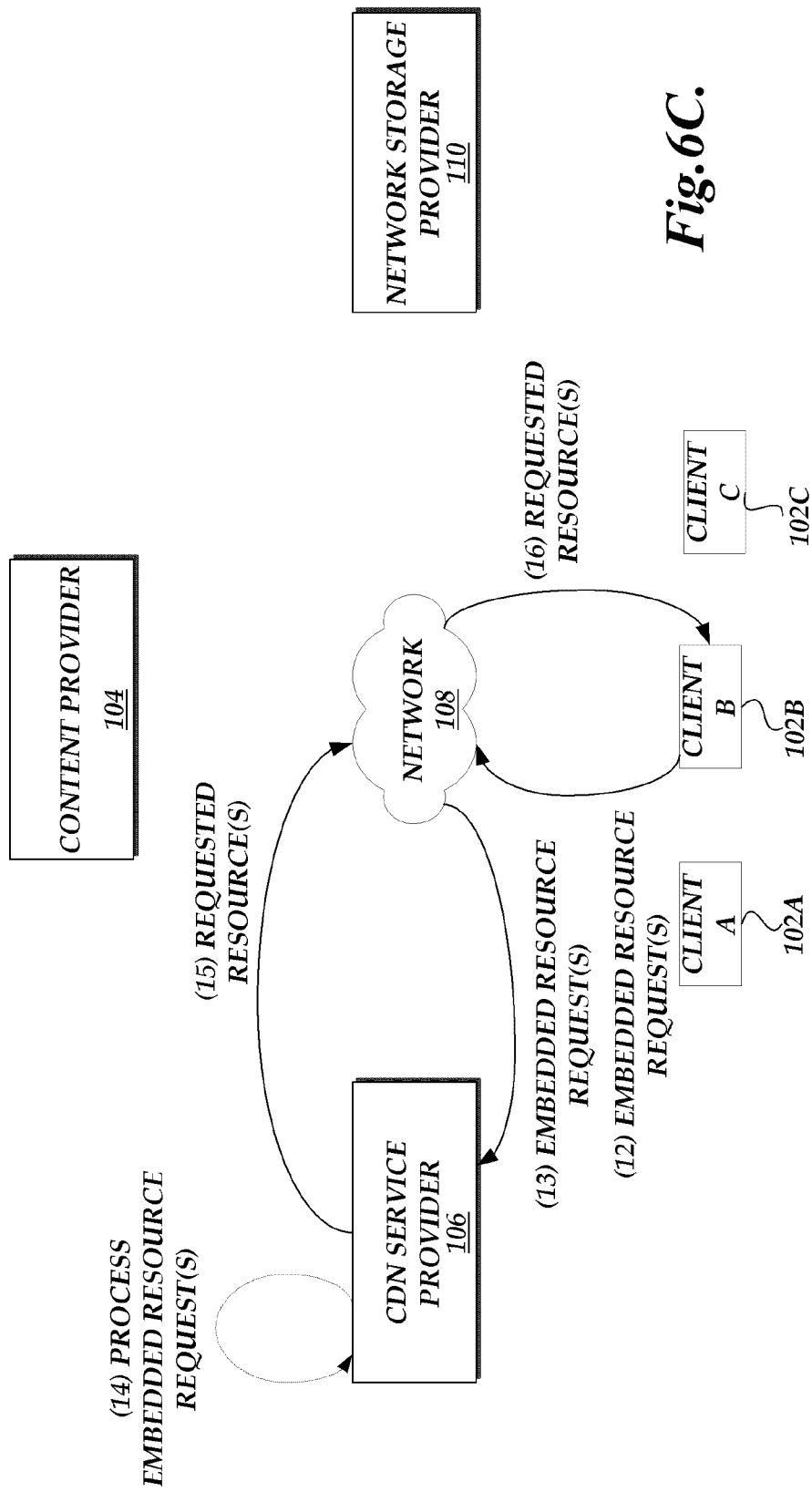

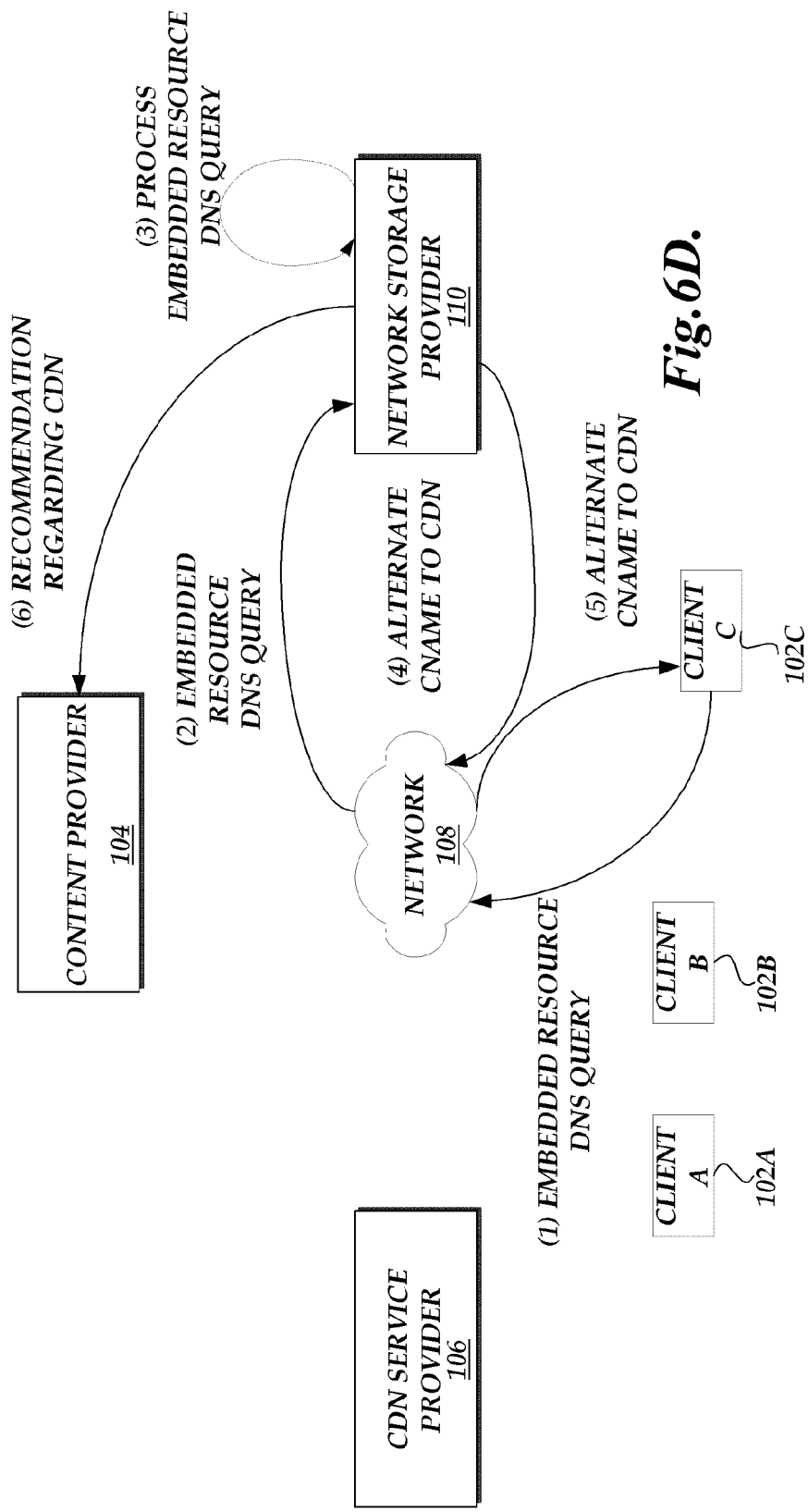

US 8,521,880 B1

MANAGING CONTENT DELIVERY NETWORK SERVICE PROVIDERS

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, which are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider(s) (or any service provider on behalf of the content provider(s)) would provide client computing devices data associated with the Web page and/or the data associated with the embedded resources.

Some content providers attempt to facilitate the delivery of requested content, such as Web pages and/or resources identified in Web pages, through the utilization of a network storage provider or a content delivery network ("CDN") service provider. A network storage provider and a CDN server provider each typically maintain a number of computing devices in a communication network that can maintain content from various content providers. In turn, content providers can instruct, or otherwise suggest to, client computing devices to request some, or all, of the content provider's content from the network storage provider's or CDN service provider's computing devices.

As with content providers, network storage providers and CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is a block diagram of the content delivery environment of FIG. 1 illustrating the generation and processing of a resource request by a client computing device to a content provider;

FIGS. 4A and 4B are block diagrams of the content delivery environment of FIG. 1 illustrating the processing of a resource request by a network storage provider and the generation of a recommendation regarding the utilization of a CDN service provider;

FIGS. 6A-6D are block diagrams of the content delivery environment of FIG. 1 illustrating various embodiments for processing of a resource request by a CDN service provider storage provider and the generation of an updated recommendation regarding the utilization of a CDN service provider;

DETAILED DESCRIPTION

Generally described, the present disclosure is directed to managing registration of one or more resources associated with a content provider with content delivery network ("CDN") service providers. Specifically, aspects of the disclosure will be described with regard to the management of CDN service providers by a network storage provider on behalf of a content provider as a function of the volume of resource requests made to the network storage provider. Although various aspects of the disclosure will be described with regard to illustrative examples and embodiments, one skilled in the art will appreciate that the disclosed embodiments and examples should not be construed as limiting.

Figure 1:
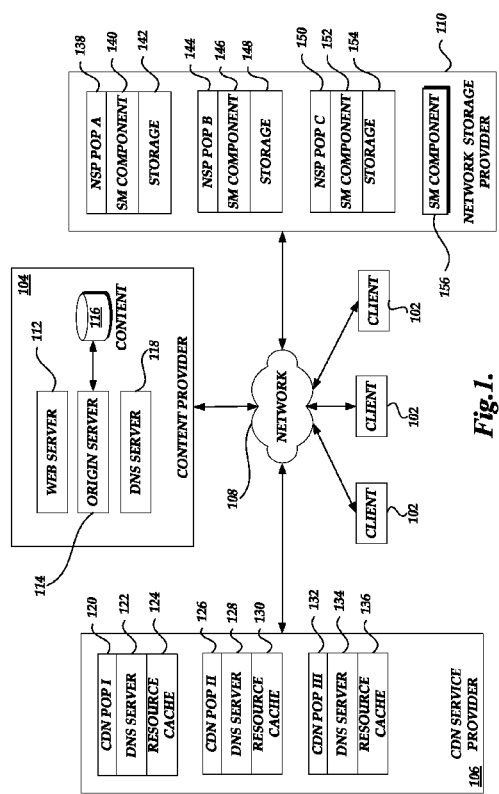
FIG. 1 is a block diagram illustrative of content delivery environment including a number of client computing devices, content provider, a network storage provider, and a content delivery network service provider.

FIG. 1 is a block diagram illustrative of content delivery environment 100 for the managing registration of content with a CDN service provider and subsequent processing of content requests. As illustrated in FIG. 1, the content delivery environment 100 includes a number of client computing devices 102 (generally referred to as clients) for requesting content from a content provider, a network storage provider 110, and/or a CDN service provider 106. In an illustrative embodiment, the client computing devices 102 can correspond to a wide variety of computing devices including personal computing devices, laptop computing devices, handheld computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS nameserver, that generates the DNS queries attributed to the client computing device. In one embodiment, the local DNS resolver component may be provide by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 112 corresponding to one or more server computing devices for obtaining and processing requests for content (such as Web pages) from the client computing devices 102. The content provider 104 can further include an origin server component 114 and associated storage component 116 corresponding to one or more computing devices for obtaining and processing requests for network resources. One skilled in the relevant art will appreciate that the content provider 104 can be associated with various additional computing resources, such additional computing devices for administration of content and resources, DNS nameservers, and the like. For example, as further illustrated in FIG. 1, the content provider 104 can be associated with one or more DNS nameserver components 118 that would receive DNS queries associated with the domain of the content provider 104 and be authoritative to resolve client computing device DNS queries corresponding to a domain of the content provider 104 (e.g., return an IP address responsive to the DNS query). A DNS nameserver component is considered to be authoritative to a DNS query if the DNS nameserver can completely resolve the query by providing a responsive IP address.

With continued reference to FIG. 1, the content delivery environment 100 can further include a CDN service provider 106 in communication with the one or more client computing devices 102, the content provider 104, and the network storage provider 110 via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 120, 126, 132 that correspond to nodes on the communication network 108. Each POP 120, 126, 132 includes a DNS component 122, 128, 134 made up of a number of DNS server computing devices for resolving DNS queries from the client computers 102. Each POP 120, 126, 132 also includes a resource cache component 124, 130, 136 made up of a number of cache server computing devices for storing resources from content providers or network storage providers and transmitting various requested resources to various client computers. The DNS components 122, 128, 134 and the resource cache components 124, 130, 136 may further include additional software and/or hardware components that facilitate communications including, but not limited, load balancing or load sharing software/hardware components.

In an illustrative embodiment, the DNS component 122, 128, 134 and resource cache component 124, 130, 136 are considered to be logically grouped, regardless of whether the components, or portions of the components, are physically separate. Additionally, although the POPs 120, 126, 132 are illustrated in FIG. 1 as logically associated with the CDN service provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

With further continued reference to FIG. 1, the content delivery environment 100 can also include a network storage provider 110 in communication with the one or more client computing devices 102, the CDN service provider 106, and the content provider 104 via the communication network 108. The network storage provider 110 illustrated in FIG. 1 also corresponds to a logical association of one or more computing devices associated with a network storage provider. Specifically, the network storage provider 110 can include a number of network storage provider Point of Presence ("NSP POP") locations 138, 144, 150 that correspond to nodes on the communication network 108. Each NSP POP 138, 144, 150 can include a storage management ("SM") component 140, 146, 152 for monitoring requests for resources and making recommendations to the content provider(s) 104 regarding the utilization of a CDN service provider 106. Additionally, the SM component 140, 146, 152 can be further operative to manage client computing device requests (either directly or indirectly) to facilitate the utilization of a CDN service provider 106 by a content provider 106.

Each NSP POP 138, 144, 150 also includes a storage component 142, 148, 154 made up of a number of storage devices for storing resources from content providers which will be processed by the network storage provider 110 and transmitted to various client computers. The storage components 142, 148, 154 may further include additional software and/or hardware components that facilitate communications including, but not limited to, load balancing or load sharing software/hardware components. In an illustrative embodiment, the storage components 142, 148, 154 are considered to be logically grouped, regardless of whether the components, or portions of the components, are physically separate. Additionally, the network storage provider 110 may include a stand alone SM component 156 that provides CDN service provider recommendations to content providers 104, such as via a Web service.

Additionally, although the NSP POPs 138, 144, 150 are illustrated in FIG. 1 as logically associated with the network storage provider 110, the NSP POPs will be geographically distributed throughout the communication network 108 in a manner to best serve various demographics of client computing devices 102. Additionally, the network storage provider 110 can be associated with various additional computing resources, such additional computing devices for administration of content and resources, DNS nameservers, and the like. For example, the network storage provider 110 can be associated with one or more DNS nameserver components that are operative to receive DNS queries related to registered domain names associated with the network storage provider 110. The one or more DNS nameservers can be authoritative to resolve client computing device DNS queries corresponding to the registered domain names of the network storage provider 110. As similarly set forth above, a DNS nameserver component is considered to be authoritative to a DNS query if the DNS nameserver can resolve the query by providing a responsive IP address. Even further, the components of the network storage provider 110 and components of the CDN service provider 106 can be managed by the same or different entities.

One skilled in the relevant art will appreciate that the components and configurations provided in FIG. 1 are illustrative in nature. Accordingly, additional or alternative components and/or configurations, especially regarding the additional components, systems and subsystems for facilitating communications may be utilized.

With reference now to FIGS. 2-6, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
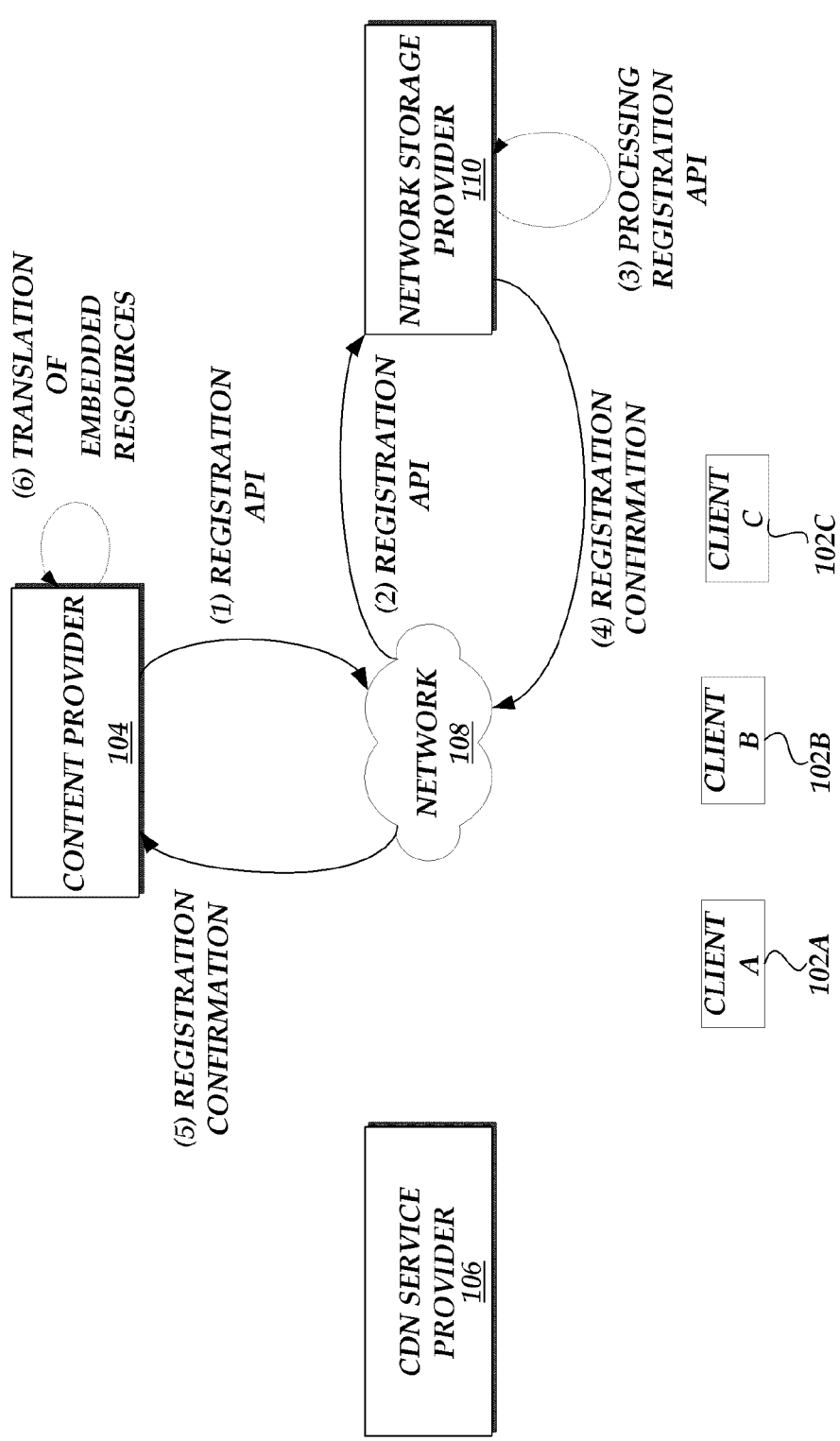
FIG. 2 is a block diagram of the content delivery environment of FIG. 1 illustrating the registration of a content provider with a network storage provider.

With reference to FIG. 2, an illustrative interaction for registration of a content provider 104 with the network storage provider 110 will be described. As illustrated in FIG. 2, the storage provider content registration process begins with registration of the content provider 104 with the network storage provider 110. In an illustrative embodiment, the content provider 104 utilizes a registration application program interface ("API") to register with the network storage provider 110 such that the network storage provider 110 can provide content on behalf of the content provider 104. The registration API includes the identification of the origin server 114 of the content provider 104 that will provide requested resources to the network storage provider 110. In addition or alternatively, the registration API includes the content to be stored by the network storage provider 110 on behalf of the content provider 104.

One skilled in the relevant art will appreciate that upon storage of the content by the network storage provider 110, the content provider 104 can begin to direct requests for content from client computing devices 102 to the network storage provider 110. Specifically, in accordance with DNS routing principles, a client computing device DNS request corresponding to a resource identifier would eventually be directed toward a storage component 140, 144, 148 of a NSP POP 138, 142, 146 associated with the network storage provider 110 (e.g., resolved to an IP address corresponding to a storage component).

In an illustrative embodiment, upon receiving the registration API, the network storage provider 110 obtains and processes the content provider registration information. In an illustrative embodiment, the network storage provider 110 can then generate additional information that will be used by the client computing devices 102 as part of the content requests. The additional information can include, without limitation, content provider identifiers, such as content provider identification codes, storage provider identifiers, such as storage provider identification codes, executable code for processing resource identifiers, such as script-based instructions, and the like. One skilled in the relevant art will appreciate that various types of additional information may be generated by the network storage provider 110 and that the additional information may be embodied in any one of a variety of formats.

The network storage provider 110 returns an identification of applicable domains for the network storage provider (unless it has been previously provided) and any additional information to the content provider 104. In turn, the content provider 104 can then process the stored content with content provider specific information. In one example, the content provider 104 translates resource identifiers originally directed toward a domain of the origin server 114 to a domain corresponding to the network storage provider 110. The modified URLs are embedded into requested content in a manner such that DNS queries for the modified URLs are received by a DNS nameserver corresponding to the network storage provider 110 and not a DNS server corresponding to the content provider 104.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provider, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

During an illustrative translation process, the content provider URL is modified such that requests for the resources associated with the modified URLs resolve to a POP associated with the network storage provider 110. In one embodiment, the modified URL identifies the domain of the network storage provider 110 (e.g., "storageprovider.com"), the same name of the resource to be requested (e.g., "resource.xxx") and the same path where the resource will be found (e.g., "path"). Additionally, the modified URL can include additional processing information (e.g., "additional information"). The modified URL would have the form of:

http://additional information. storageprovider.com/path/resource.xxx

In another embodiment, the information associated with the network storage provider 110 is included in the modified URL, such as through prepending or other techniques, such that the modified URL can maintain all of the information associated with the original URL. In this embodiment, the modified URL would have the form of:

http://additional information. storageprovider.com/www-.contentprovider.com/path/resource.xxx With reference now to FIG. 3, after completion of the registration and translation processes illustrated in FIG. 2, a first client computing device 102A subsequently generates a content request that is received and processed by the content provider 104, such as through the Web server 112. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102A via the processing of information, such as hypertext markup language ("HTML"), extensible markup language ("XML"), and the like. The requested content can also include a number of embedded resource identifiers, described above, that corresponds to resource objects that should be obtained by the client computing device 102A as part of the processing of the requested content. The embedded resource identifiers will generally in the form of the modified URLs, described above. Alternatively, the embedded resource identifiers can remain in the form of the content provider URLs that would be received and processed by a DNS nameserver associated with the content provider 104. In this alternative embodiment, the receiving DNS nameserver would use a canonical name record ("CNAME") that would identify the network storage component 110. Upon receipt of the returned CNAME, the client computing device 102A subsequently transmits a DNS query corresponding to the received CNAME. The client computing device 102A can then process the received CNAME in a manner similar to the modified URLs, described below. For ease of illustration, however, the alternative embodiment will not be described in further detail and the additional processing steps will only be described with regard to the modified URL. One skilled in the relevant will appreciate that the below description may be applicable to CNAMEs as described in the alternative embodiment.

With reference now to FIG. 4A, upon receipt of the requested content, the client computing device 102A, such as through a browser software application, begins processing any of the markup code included in the content and attempts to acquire the resources identified by the embedded resource identifiers (e.g., the embedded, modified URLs). Accordingly, the first step in acquiring the content correspond to the issuance, by the client computing device 102 (through its local DNS resolver), a DNS query for the Original URL resource identifier that results in the identification of a DNS server authoritative to the "." and the "com" portions of the modified URL. After partially resolving the modified URL according to the "." and "com" portions of the embedded URL, the client computing device 102A then issues another DNS query for the resource URL that results in ".storageprovider" portion of the embedded, modified URL. The issuance of DNS queries corresponding to the "." and the "com" portions of a URL, such as the modified URL, are well known and have not been illustrated.

In an illustrative embodiment, the identification of the identification of a DNS server authoritative to the "storageprovider" corresponds to an IP address of a DNS server associated with the network storage provider 110. In one embodiment, the IP address is a specific network address unique to a DNS server component of a POP. In another embodiment, the IP address can be shared by one or more POPs. In this embodiment, a further DNS query to the shared IP address utilizes a one-to-many network routing schema, such as anycast, such a specific POP will receive the request as a function of network topology. For example, in an anycast implementation, a DNS query issued by a client computing device 102A to a shared IP address will arrive at a DNS server component of the network storage provider 110 logically having the shortest network topology distance, often referred to as network hops, from the client computing device. The network topology distance does not necessarily correspond to geographic distance. However, in some embodiments, the network topology distance can be inferred to be the shortest network distance between a client computing device 102A and a network storage provider POP. With continued reference to FIG. 4A, once one of the DNS servers in the network storage provider 110 receives the request, the specific DNS server attempts to resolve the request. In an illustrative embodiment, a specific DNS server can resolve the DNS query by identifying an IP address of a network storage provider storage component 142, 148, 154 (FIG. 1) that will process the request for the requested resource.

Figure 4B:
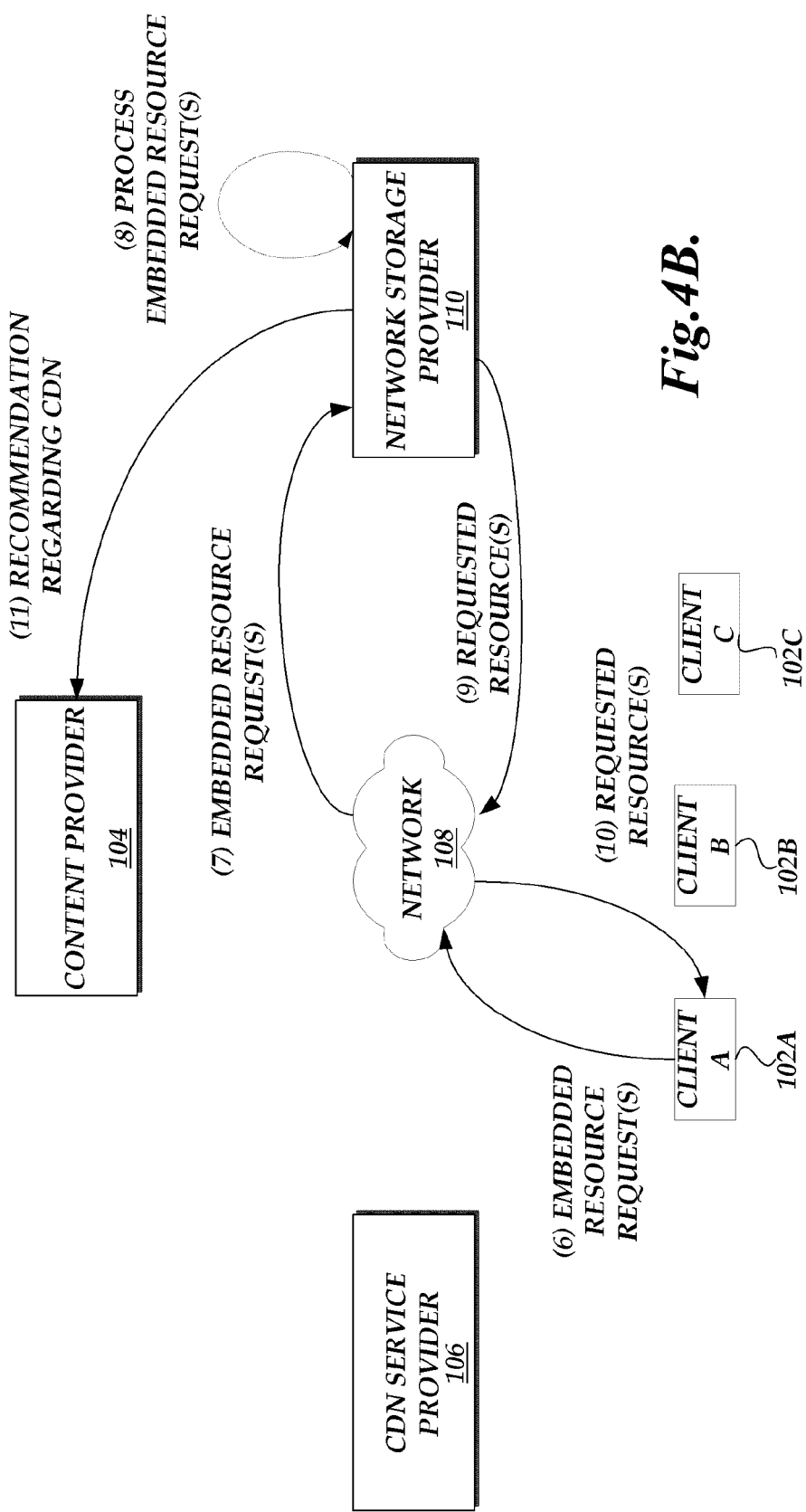

With reference now to FIG. 4B, upon receipt of the successful resolution of the DNS query to the storage provider component (e.g., a DNS query corresponding to the modified URL http://additional information.storageprovider.com/path/resource.xxx), the client computing device 102A transmits embedded resource requests to the network storage provider storage component 142, 148, 154 (FIG. 1) corresponding to the previously provided IP address. In turn, the receiving network storage provider storage component can process the request by providing the requested content obtained from the origin server 114 of the content provider 104. The requested content can be transmitted to the requesting client computing device 102A via the communication network 108.

As will be explained in greater detail below, the SM components 140, 146, 152, 156 (or other component) of the network storage provider 110 can maintain request processing information regarding the number of requests for each resource, or a subset of resources, provided by the network storage provider 110. The request processing information can include the total number of requests obtained by the network storage provider 110 for a resource over a defined period of time, trends regarding an increase/decrease in requests for the resource, a current cost associated with the delivery of the resource by the network storage provider, and various combinations or alternatives thereof. Based on the information maintained by the SM components 140, 146, 152, 156 (either individually maintained or shared), the network storage provider 110 can utilize processing criteria to make a recommendation to the content provider 104 that a CDN service provider 106 should be utilized to serve the requested resource or set of resources (e.g., all resources corresponding to a domain or a portion of a domain). As will be explained below, the content provider 104 can then obtain the services of a CDN service provider 106 or have such service acquired on its behalf, such as through the network storage provider 110.

Figure 5A:
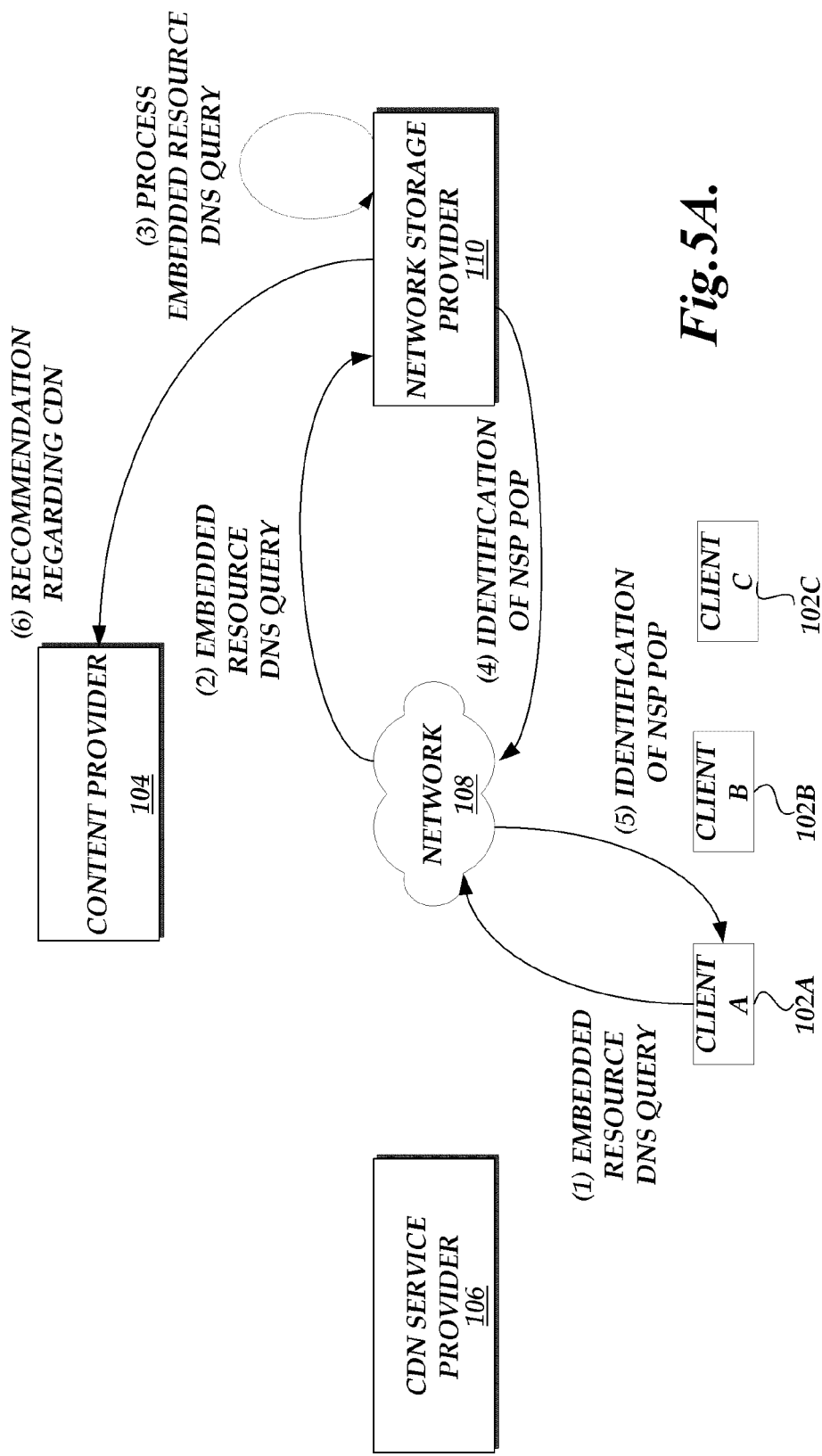
FIGS. 5A and 5B are block diagrams of the content delivery environment of FIG. 1 illustrating another embodiment for processing of a resource request by a network storage provider and the generation of a recommendation regarding the utilization of a CDN service provider.
Figure 5B:
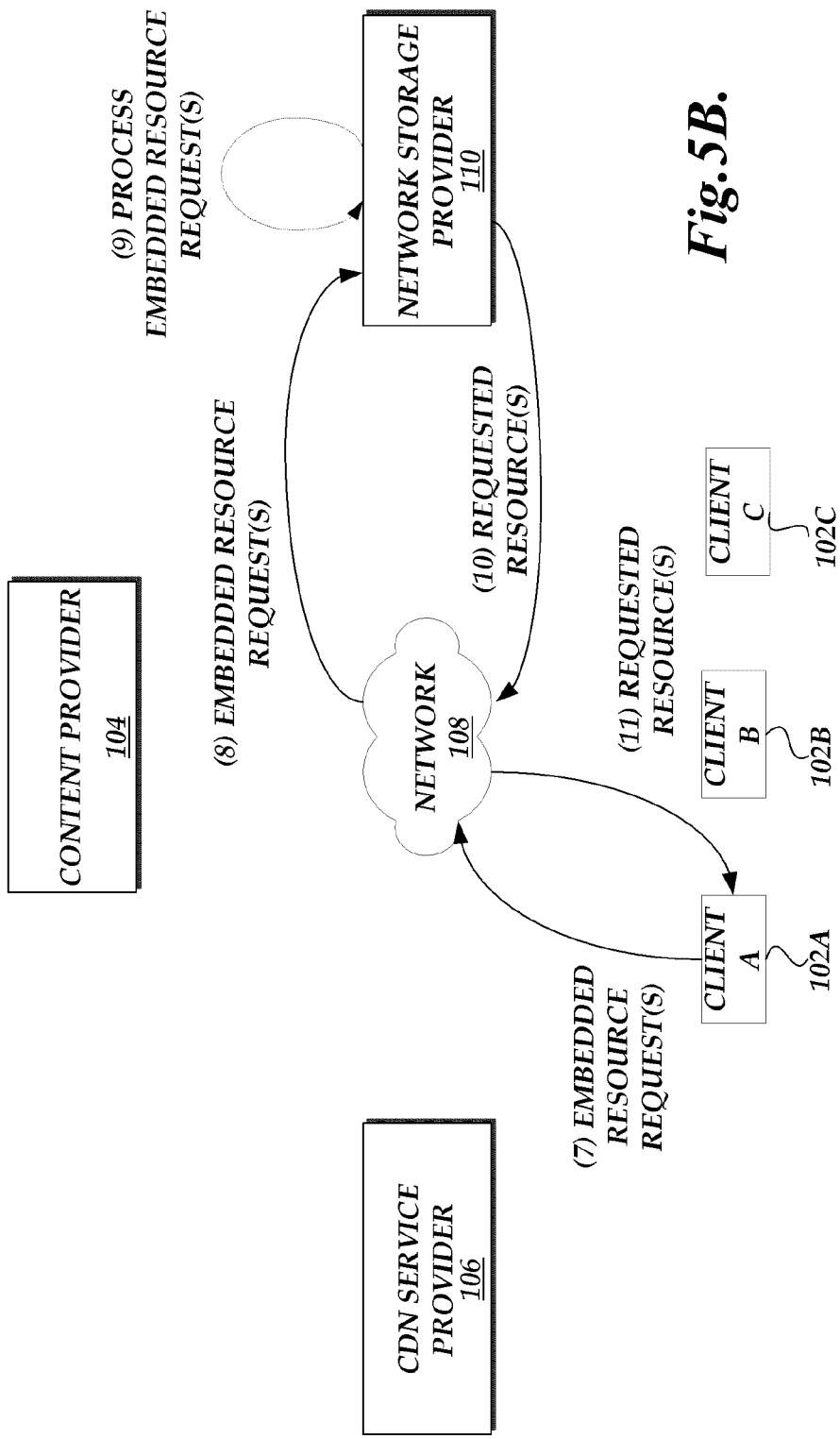

With reference now to FIGS. 5A and 5B, in an alternative embodiment, the network storage provider 110 may monitor requests for resources based on the DNS query submitted by the client computing device 102A and make corresponding recommendations regarding the use of a CDN service provider 106. As above with regard to FIG. 4A, upon receipt of the requested content, the client computing device 102A, such as through a browser software application, begins processing any of the markup code included in the content and attempts to acquire the resources identified by the embedded resource identifiers. Accordingly, the first step in acquiring the content correspond to the issuance, by the client computing device 102 (through its local DNS resolver), a DNS query for the embedded, modified URL resource identifier that results in the identification of a DNS server authoritative to the "." and the "com" portions of the modified URL. After partially resolving the "." and "com" portions of the embedded URL, the client computing device 102A then issues another DNS query for the resource URL that results in the identification of a DNS server authoritative to the ".storageprovider" portion of the embedded, modified URL.

Illustratively, the identification of the identification of a DNS server authoritative to the "storageprovider" corresponds to an IP address of a DNS server associated with the network storage provider 110. Once one of the DNS servers in the network storage provider 110 receives the request, the specific DNS server attempts to resolve the request. In an illustrative embodiment, a specific DNS server can resolve the DNS query by identifying an IP address of a network storage provider storage component 142, 148, 154 (FIG. 1) that will process the request for the requested resource. As also illustrated in FIG. 5A, in an alternative embodiment, the SM components 140, 146, 152, 156 can of the network storage provider 110 can maintain request processing information regarding the number of requests for each resource, or a subset of resources, provided by the network storage provider 110. As described above, the request processing information can include the total number of requests obtained by the network storage provider 110 for a resource over a defined period of time, trends regarding an increase/decrease in requests for the resource, a current cost associated with the delivery of the resource by the network storage provider, and various combinations or alternatives thereof. Based on the information maintained by the SM components 140, 146, 152, 156 (either individually maintained or shared), the network storage provider 110 can utilize processing criteria to make a recommendation to the content provider 104 that a CDN service provider 106 should be utilized to serve the requested resource. As will be explained below, the content provider 104 can then obtain the services of a CDN service provider 106 or have such service acquired on its behalf, such as through the network storage provider 110. Illustratively, the "additional information" portion of the original URL (e.g., http://additional information.storageprovider.com/ path/resource.xxx) can include a resource identifier that can be parsed by a receiving DNS nameserver of the network storage provider and utilized by the SM components 140, 146, 152, 156 to update the information regarding the number of requests for each resource.

With reference now to FIG. 5B, upon receipt of the successful resolution of the DNS query to the storage provider component (e.g., a DNS query corresponding to the modified URL http://additional information.storageprovider.com/ path/resource.xxx), the client computing device 102A transmits embedded resource requests to the network storage provider storage component 142, 148, 154 (FIG. 1) corresponding to the previously provided IP address. In turn, the receiving network storage provider storage component can process the request by providing the requested content obtained from the origin server 114 of the content provider 104. The requested content can be transmitted to the requesting client computing device 102A via the communication network 108. As illustrated in FIG. 5B, in one embodiment, the recommendations provided by the SM components 140, 146, 152, 156 regarding the utilization of a CDN service provider 106 have already been provided to the content provider 104 and would not necessarily have to be provided as part of the delivery of the requested resource to the client computing device 102A.

With reference now to FIGS. 6A-6C, regardless of whether the embodiment disclosed in FIG. 4 or FIG. 5 is utilized (or other alternative), assume that the content provider has authorized (directly or indirectly) the utilization of a CDN service provider 106. In one embodiment, the content provider 104 can authorize the implementation of a CDN server provider 106 in accordance with APIs or graphical user interfaces that facilitate the authorization and initialization of one or more CDN service providers 106. Additionally, the content provider 104 can implement logic, or programmatic instructions, that facilitate the authorization and initialization of one or more CDN service providers 106 without requiring human interaction.

Subsequent to the authorization of the utilization of the CDN service provider 106, a client computing device, illustratively client computing device 102B, repeats the request for a resource and is returned the requested resource with a number of embedded resource (similar to the interaction illustrated in FIG. 3). With reference to FIG. 6A, the client computing device 102B transmits a DNS query for an embedded resource (e.g., (e.g., http://additional information.storageprovider.com/path/resource.xxx), which is received by a DNS nameserver at the network storage provider 110.

In an illustrative embodiment, instead of providing an embedded resource from a network storage provider storage component 142, 148, 154, the network storage provider 110 can maintain sets of various alternative resource identifiers corresponding to one or more CDN service providers 106. The alternative resource identifiers can be provided by the network storage provider 110 to the client computing device 102B such that a subsequent DNS query on the alternative resource identifier will resolve to a DNS server component within the CDN service provider's network. The network storage provider 110 may select (or otherwise obtain) an alternative resource identifier that is intended to resolve to an appropriate DNS server of the CDN service provider 106 based on a variety of criteria. For example, the network storage provider may select an alternative resource identifier based on a regional service plan or service level information obtained from the content provider. As will be described further below, this additional information may also be used for further request routing.

In an illustrative embodiment, the alternative resource identifiers are in the form of one or more CNAME records. In one embodiment, each CNAME record identifies a domain of the CDN service provider 106 (e.g., "cdnprovider.com" or "cdnprovider-1.com"). As will be explained in greater detail below, the domain in the CNAME does not need to be the same domain found in original URL. Additionally, each CNAME record includes additional information, such as request routing information, (e.g., "request routing information"). An illustrative CNAME record can have the form of:

http://additionalinformation.storageprovider.com/path/resource.xxx CNAME request_routing_information.cdnprovider.com In accordance with an illustrative embodiment, the network storage provider 110 maintains a data store that defines CNAME records for various URLs corresponding to embedded resources stored by the network storage provider 110. If a DNS query corresponding to a particular URL matches an entry in the data store, the network storage provider 110 returns a CNAME record to the client computing device 102B that will direct the client computing device to a CDN service provider 106.

The returned CNAME can also include request routing information that is different from or in addition to the information provided in URL of the current DNS query. For example, if the CNAME selection is based on a regional service plan or a service level plan selected by the content provider 104, a specific identifier can be included in the "request routing information" portion of the specific CNAME record. In another embodiment, request routing information can be found in the identification of a CDN service provider 106 domain different from the domain found in the original URL. For example, if the CNAME is based on a regional plan, a specific regional plan domain (e.g., "cdnprovder-region1.com") could be used in the domain name portion of the specific CNAME record. Any additional request routing information can be prepended to the existing request routing information in the original URL such that the previous request routing information would not be lost (e.g., http://serviceplan.regionalplan.cdnprovider.com). One skilled in the relevant art will appreciate that additional or alternative techniques and/or combination of techniques may be used to include the additional request routing information in the CNAME record that is identified by the network storage provider 110.

With reference now to FIG. 6B, once the client computing device 102B obtains the returned CNAME, the client computing device generates a subsequent DNS query corresponding to the CNAME. As previously discussed with regard to FIG. 4A, the DNS query process could first start with DNS queries for the "." and "com" portions, followed by a query for the "cdnprovider" portion of the CNAME. To the extent, however, that the results of a previous DNS queries can be cached (and remain valid), the client computing device 102B can utilize the cached information and does not need to repeat the entire process. Similar to the process described with regard to FIG. 4A, the client computing device 102B issues a DNS query for the resource URL that results in ".cdnprovider" portion of the CNAME.

In an illustrative embodiment, the identification of the identification of a DNS server authoritative to the "cdnprovider" corresponds to an IP address of a DNS server associated with the CDN server provider, such as DNS nameserver components 122, 128, 134 (FIG. 1). In one embodiment, the IP address is a specific network address unique to a DNS server component of a POP. In another embodiment, the IP address can be shared by one or more POPs. In this embodiment, a further DNS query to the shared IP address utilizes a one-to-many network routing schema, such as anycast, such a specific POP will receive the request as a function of network topology. For example, in an anycast implementation, a DNS query issued by a client computing device 102B to a shared IP address will arrive at a DNS server component 122, 128, 134 (FIG. 1) of the CDN service provider 106 logically having the shortest network topology distance, often referred to as network hops, from the client computing device. As previously discussed, the network topology distance does not necessarily correspond to geographic distance. However, in some embodiments, the network topology distance can be inferred to be the shortest network distance between a client computing device 102B and a network storage provider POP 120, 126, 132 (FIG. 1).

In an illustrative embodiment, the DNS server components, illustratively DNS server component 128, can utilize a variety of information in selecting a resource cache component. In one example, the DNS server component 128 can default to a selection of a resource cache component of the same POP. In another example, the DNS server components can select a resource cache component based on various load balancing or load sharing algorithms. Still further, the DNS server components can utilize network performance metrics or measurements to assign specific resource cache components. The IP address selected by a DNS server component may correspond to a specific caching server in the resource cache. Alternatively, the IP address can correspond to a hardware/software selection component (such as a load balancer).

With reference now to FIG. 6C, in an illustrative example, assume that the CDN service provider 106 has selected the resource cache component 130 of POP 126 (FIG. 1). Upon receipt of the IP address for the resource cache component 130, the client computing device 102B transmits requests for the requested content to the resource cache component 130.

The resource cache component 130 processes the request in a manner described above and the requested content is transmitted to the client computing device 102B.

As previously described, the network storage provider 110 maintains the table of alternative resource identifiers (e.g., CNAMES) that are used to direct a client computing device 102 to a CDN service provider 106. In an illustrative embodiment, the network storage provider 110 can manage the list of alternative resource identifiers such that the content provider 104 can utilize a different CDN service provider 106. For example, the network storage provider 110 can continuously calculate a cost associated with processing requests for specific resources and make updated recommendations regarding the utilization of a CDN service provider 106 or the utilization of a different CDN service provider.

With reference now to FIG. 6D, assume that the content provider has authorized (directly or indirectly) the utilization of a different CDN service provider 106 that the CDN service provider illustrated in FIGS. 6A-6C. Subsequent to the authorization of the utilization of the different CDN service provider 106, the network storage provider 110 modifies the list of alternative resource identifiers to identify the different CDN service provider. Thereafter, a client computing device 102, illustratively client computing device 102C, repeats the request for a resource and is returned the requested resource with a number of embedded resource (similar to the interaction illustrated in FIG. 2). The client computing device 102C transmits a DNS query for an embedded resource (e.g., http://additional information.storageprovider.com/path/resource.xxx), which is received by a DNS nameserver at the network storage provider 110.

As previously described, instead of providing an embedded resource from a network storage provider storage component 142, 148, 154, the network storage provider 110 provides an alternative resource identifier corresponding to a different CDN service provider 106 (e.g., an alternate CNAME) to the client computing device 102C such that a subsequent DNS query on the alternative resource identifier will resolve to a DNS server component within the CDN service provider's network. The process for resolving a CNAME and requesting an embedded resource was previously described with regard to FIGS. 6B and 6C. Additionally, as illustrated in FIG. 6D, the network storage provider 110 can continuously update the information regarding the requested resource (e.g., the total number of requests obtained by the network storage provider 110 for a resource over a defined period of time, trends regarding an increase/decrease in requests for the resource, a current cost associated with the delivery of the resource by the network storage provider, and various combinations or alternatives thereof) and make updated recommendations regarding the utilization of a CDN service provider 106 in general or particular CDN service providers.

Figure 7A:
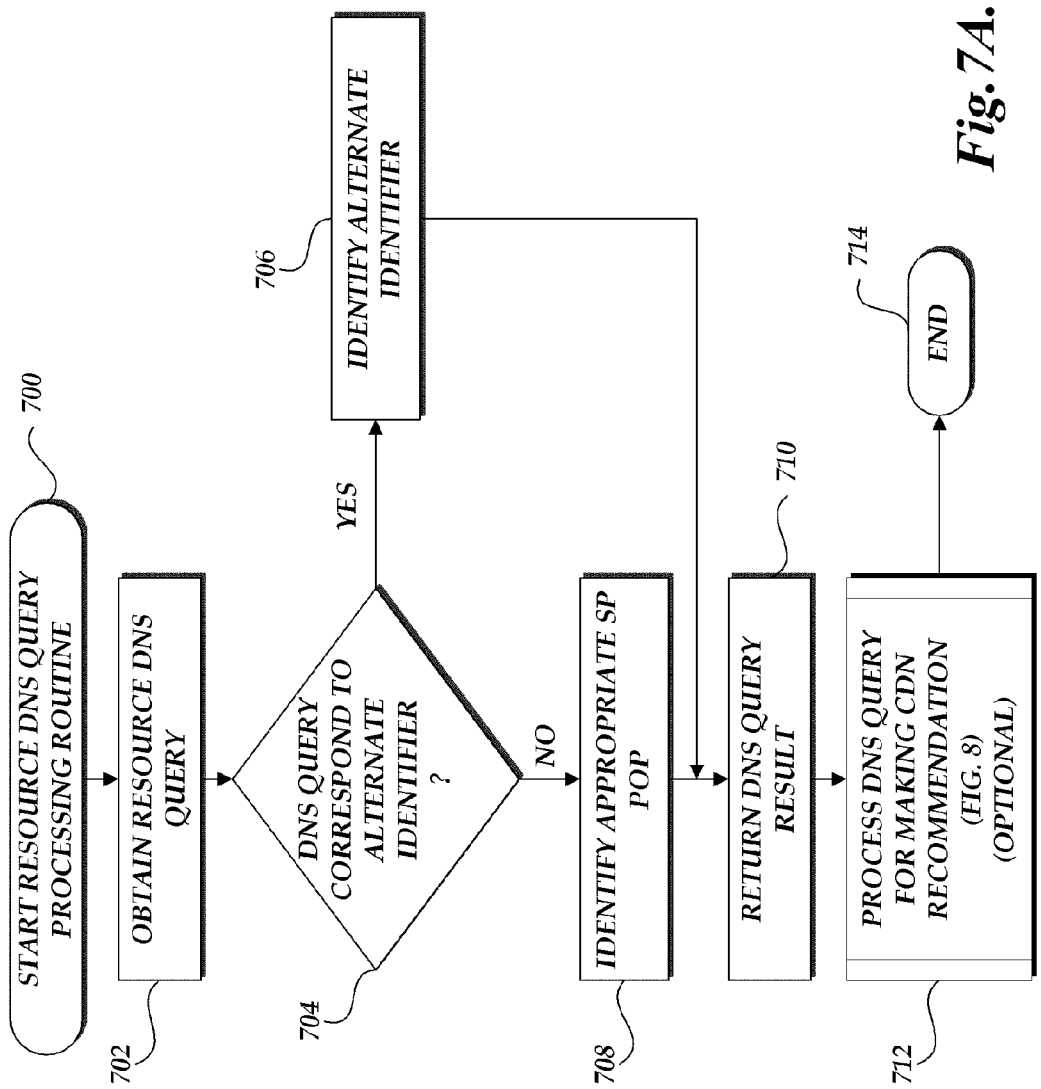
FIG. 7A is a flow diagram illustrative of a resource DNS query processing routine implemented by a network storage provider.

With reference now to FIG. 7A, a flow diagram illustrative of a resource DNS query processing routine 700 implemented by a network storage provider 110 will be described. One skilled in the relevant art will appreciate that actions/steps outlined for routine 700 may be implemented by one or many computing devices/components that are associated with the network storage provider 110. Accordingly, routine 700 has been logically associated as being performed by the network storage provider 110.

At block 702, one of the DNS nameservers at the network storage provider 110 (or corresponding to the network storage provider) receives a DNS query corresponding to resource identifier. As previously discussed, the resource identifier can be a URL that has been embedded in content requested by the client computing device 102 and previously provided by the content provider 104. At decision block 704, a test is conducted to determine whether the receiving DNS nameserver is authoritative to resolve the DNS query. In an illustrative embodiment, the receiving DNS nameserver can determine whether it is authoritative to resolve the DNS query if there are no CNAME records corresponding to the received resource identifier. As previously discussed, for purposes of the routine 700, a DNS nameserver component is considered to be authoritative to a DNS query if the DNS nameserver can resolve the query by providing a responsive IP address. In this context, the DNS nameserver may be operative to receive DNS queries on behalf network storage provider 110, but not authoritative if the DNS query cannot be completely resolved by providing a responsive IP address. Alternative or additional methodologies may also be practiced to determine whether the DNS server is authoritative.

If at decision block 704 the receiving DNS nameserver is not authoritative, at block 706, the DNS nameserver selects and transmits an alternative resource identifier. As described above, the DNS nameserver can utilize a data store to identify an appropriate CNAME as a function of the current DNS query. Additionally, the DNS server component can also implement additional logical processing to select from a set of potential CNAMES. The routine 700 proceeds to block 710.

Alternatively, if the receiving DNS server is authoritative (including a determination that the same DNS nameserver will be authoritative for subsequent DNS queries), the receiving DNS nameserver resolves the DNS query by identifying the IP address of network storage provider storage component 142, 148, 154 (FIG. 1) at block 708. In a non-limiting manner, a number of methodologies for selecting an appropriate network storage provider storage component 142, 148, 154 have been previously discussed and may be utilized by the network storage provider 110.

At block 710, the receiving DNS nameserver returns the DNS query result to the requesting client computing device 102. As previously described, the DNS query result can include an identification of an IP address of a network storage provider storage component 142, 148, 154 if the network storage component 110 is going to process the subsequent resource request or a CNAME if a CDN service provider 106 will process the subsequent resource request. At block 712, the network storage component 110 can process the received DNS query for making a recommendation (or updating a recommendation) for a CDN service provider. A subroutine for processing the DNS query for making a recommendation will be described with regard to FIG. 8. At block 714, the routine 700 terminates.

Figure 7B:
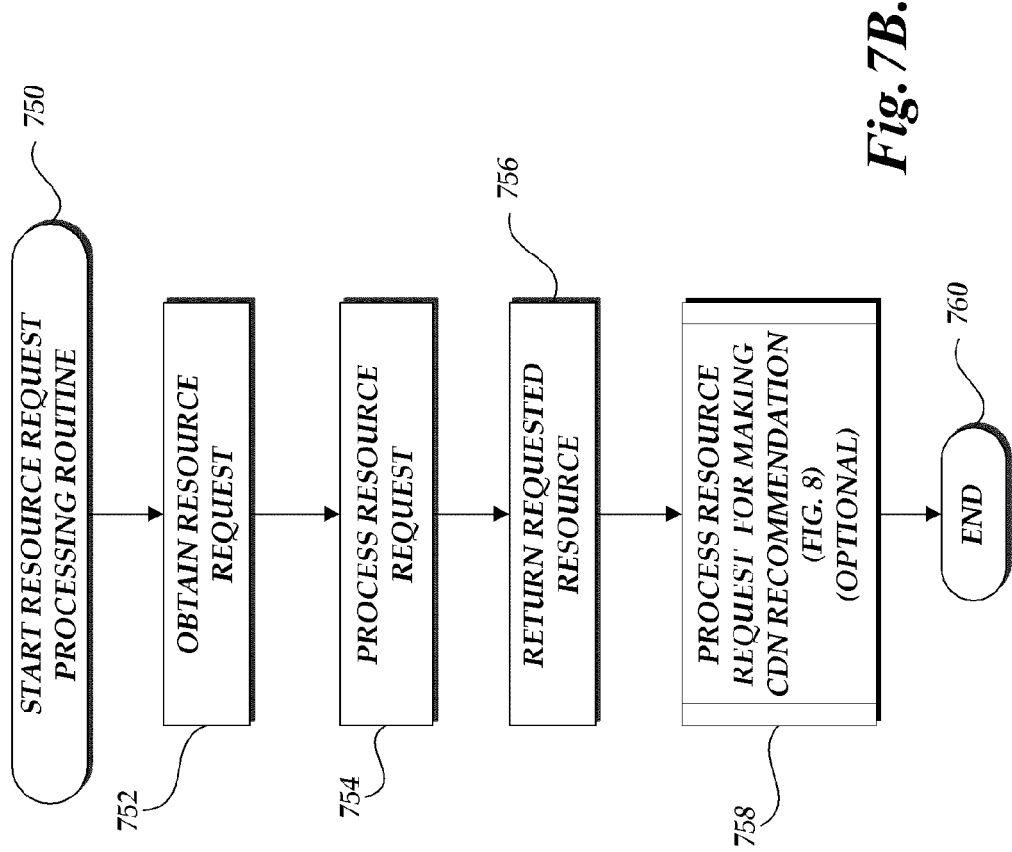
FIG. 7B is a flow diagram illustrative of a resource request processing routine implemented by a network storage provider.

With reference now to FIG. 7B, a flow diagram illustrative of a resource request processing routine 750 implemented by a network storage provider 110 will be described. In an illustrative embodiment, it is assumed that a client computing device 102 DNS query has been previously resolved to identify a network storage provider storage component 142, 148, 154. At block 752, the network storage provider 110 obtains a resource request. In an illustrative embodiment, the resource request can identify the embedded resource to be provided by the network storage provider 110. For example, the client computing device 102 can request the resource in accordance with commands associated with the hypertext transfer protocol (HTTP).

At block 754, the network storage provider 110 processes the resource request and obtains the requested resource. At block 756, the network storage provider 110 transmits the requested resource to the client computing device. At block 758, the network storage component 110 can process the received resource request for making a recommendation (or updating a recommendation) for a CDN service provider. A subroutine for processing the resource request for making a recommendation will be described with regard to FIG. 8. At block 714, the routine 750 terminates.

Figure 8:
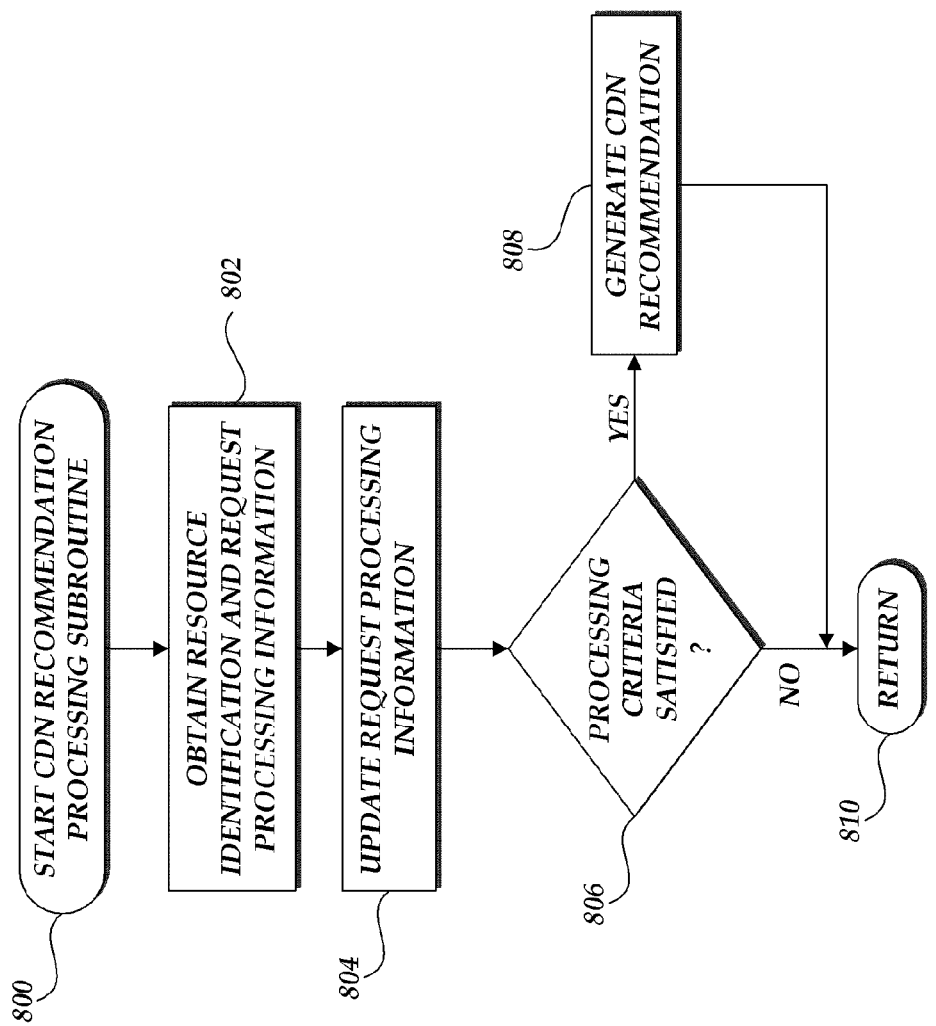
FIG. 8 is a flow diagram illustrative of a CDN service provider recommendation processing routine implemented by a network storage provider.

With reference now to FIG. 8, a flow diagram illustrative of a CDN service provider recommendation processing routine 800 implemented by a network storage provider 110 will be described. At block 802, the network storage provider 110 obtains the resource identification corresponding to the DNS query (FIG. 7A) or resource request (FIG. 7B). As previously described, in an illustrative embodiment, the network storage provider 110 can parse the DNS query and identify any resource identifiers included in the original URL. The network storage provider 110 then obtains any request processing information currently associated with the identified resource. As previously described, the request processing information can include the total number of requests obtained by the network storage provider 110 for a resource over a defined period of time, trends regarding an increase/decrease in requests for the resource, a current cost associated with the delivery of the resource by the network storage provider, and various combinations or alternatives thereof. At block 804, the network storage provider 110 updates the request processing information in accordance with the received request.

At decision block 806, a test is conducted to determine whether processing criteria associated with the request processing information has been satisfied. The processing criteria will likely depend on the type of request processing information maintained by the network storage provider 110. For example, if the request processing information corresponds to a total number of requests received over a time, the network storage provider 110 can maintain thresholds corresponding to request totals (or range of totals) (including multiple thresholds) for determining whether the network storage provider 110 should recommend to incorporate a CDN service provider 106 or to cease using a CDN service provider. If the request processing information corresponds to trends regarding an increase/decrease in requests for the resource, the network storage provider 110 can maintain thresholds corresponding to trends relate to the increase/decrease for determining whether the network storage provider 110 should recommend to incorporate a CDN service provider 106 or to cease using a CDN service provider. Still further, if the request processing information corresponds to a total cost associated with processing the requested resource by the network storage provider 110, the network storage provider 110 can maintain thresholds corresponding to costs (or range of costs) (including multiple thresholds) for determining whether the network storage provider 110 should recommend to incorporate a CDN service provider 106 or to cease using a CDN service provider. Additionally, the network storage provider 110 can also maintain cost information for various CDN service providers 106 to make a comparison whether the current cost is less then the likely cost associated with one or more CDN service providers. One skilled in the relevant art will appreciate, however, that additional or alternative criteria (or combination thereof) could be utilized to determine whether to make a recommendation regarding a CDN service provider 106.

If the processing criteria are satisfied at decision block 806, the network storage provider 110 generates a CDN recommendation. In one embodiment, the recommendation can correspond to information/notifications transmitted (or otherwise communicated) to a corresponding content provider 104. The information/notification can also include additional information, such as Uniform Resource Identifier (URI), that facilitates the selection and initialization of the selected CDN service provider 106. Alternatively, the network storage provider 110 can be configured to automatically initialize the CDN service provider 106 without requiring additional interaction from the content provide 104 or system administrator or other user. For example, a content provider 104 may pre-register with the network storage provider 110 to provide the processing criteria (e.g., total number of requests or cost thresholds) such that the network storage provider 110 can automatically initialize a CDN service provider 106. In an illustrative embodiment, the network storage provider 110 can maintain a set of preferred CDN service providers 106 to be suggested to the content provider 104. Alternatively, the network storage provider 110 can execute a testing environment in which the performance of several CDN service providers 106 are tested. The performance information may be utilized in conjunction with the CDN service provider recommendation. Still further, the content provider 104 may have pre-selected one or more CDN service providers 106.

If the request processing criteria have not been satisfied to make a CDN service provider recommendation or once the network storage component 110 has made a CDN service provider recommendation, at block 810, sub-routine 800 returns.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment. Moreover, unless specifically stated otherwise, or otherwise understood within the context as used, is generally intended to convey utilization of the conjunction "or" in enumerating a list of elements does not limit the selection of only a single element and can include the combination of two or more elements.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing content requests comprising:
   a data store operative to maintain request processing information corresponding to requested resources;
   one or more storage components operative to store resources and provide the resources in response to client computing device requests; and
   a storage management component operative to:
      obtain information associated with processing of a client computing device request for a resource;
      update the request processing information maintained in the data store corresponding to the request for the resource;
      determine one or more delivery costs corresponding to each of one or more content delivery network (CDN) service providers, wherein each of the one or more CDN service providers is operative to provide resources on behalf of a content provider, wherein the one or more delivery costs correspond to a financial cost incurred by the content provider for providing the requested resource in the future using respective ones of the one or more CDN service providers, and wherein the one or more delivery costs are based on the updated request processing information; and
      generate a recommendation to the content provider regarding use of a CDN service provider as a function of the determined one or more delivery costs.

2. The system as recited in claim 1, wherein the client computing device request for the resource corresponds to a domain name system (DNS) query corresponding to an embedded resource.

3. The system as recited in claim 2, wherein a universal resource locator (URL) corresponding to the DNS query includes at least one field identifying the requested resource that can be identified during the processing of the DNS query.

4. The system as recited in claim 1, wherein the client computing device request for the resource corresponds to a request corresponding to an embedded resource received at one of the one or more storage components.

5. The system as recited in claim 1, wherein the request processing information includes at least one of a total number of requests obtained from client computing devices for a resource over a defined period of time, trends regarding an increase in requests from client computing devices for the resource, trends regarding a decrease in requests from client computing devices for the resource and a current financial cost associated with the delivery of the resource by storage component.

6. The system as recited in claim 1, wherein the recommendation to the content provider regarding use of a CDN service provider as a function of the updated request processing information corresponds to an identification of one or more CDN service providers that can be incorporated by the content provider to process subsequent requests for the requested resource.

7. The system as recited in claim 1, wherein the storage management component is further operative to cause the registration of a CDN service provider with the content provider such that the CDN service provider will begin providing the requested resource on behalf of the content provider.

8. The system as recited in claim 7, wherein the registration of the CDN service provider is completed automatically without requiring additional interaction from the content provider.

9. The system as recited in claim 1, wherein the storage management component is further operative to:
- obtain information indicative of subsequent client computing device requests for a resource;
- update the request processing information maintained in the data corresponding to the subsequent request for the resource; and
- generate an alternative recommendation regarding a CDN service provider as a function of the updated request processing information.

10. The system as recited in claim 9, wherein the alternative recommendation regarding a CDN service provider includes a recommendation to cease a utilization of an existing CDN service provider.

11. A method comprising:
- obtaining a request from a client computing device for a resource;
- processing the request for the resource, the processing of the request for the resource including providing the requested resource to the client computing device;
- updating request processing information corresponding to the request for the resource;
- determining one or more delivery costs corresponding to each of one or more content delivery network (CDN) service providers, wherein each of the one or more CDN service providers is operative to provide resources on behalf of a content provider, wherein the one or more delivery costs correspond to a financial cost incurred by the content provider for providing the requested resource in the future using respective ones of the one or more CDN service providers, and wherein the one or more delivery costs are based on the updated request processing information; and
- generating a recommendation to the content provider regarding use of a CDN service provider as a function of the determined one or more delivery costs.

12. The method as recited in claim 11 further comprising:
- obtaining a domain name system (DNS) query from a client computing device, the DNS query subsequent to the request for the resource; and
- providing an alternative resource identifier responsive to the DNS query, the alternative resource identifier associated with a CDN service provider identified corresponding to the recommendation.

13. The method as recited in claim 12 further comprising:
- updating request processing information corresponding to the DNS query for the resource; and
- generating an updated recommendation regarding a CDN service provider as a function of the updated request processing information.

14. The method as recited in claim 13 further comprising:
- obtaining a subsequent DNS query from a client computing device; and
- providing a different alternative resource identifier responsive to the subsequent DNS query, the different alternative resource identifier associated with a CDN service provider identified corresponding to the updated recommendation.

15. The method as recited in claim 11, wherein generating a recommendation to the service provider regarding use of a CDN service provider as a function of the updated request processing information includes generating a notification identifying one or more CDN service providers that may be utilized by the content provider.

16. The method as recited in claim 11, wherein generating a recommendation to the service provider regarding use of a CDN service provider as a function of the updated request processing information includes initializing of a CDN service provider to begin providing the requested resource on behalf of the content provider.

17. The method as recited in claim 16, wherein initializing of a CDN service provider to begin providing the requested resource on behalf of the content provider includes automatically initializing the CDN service provider without requiring interaction by the content provider.

18. The method as recited in claim 12, wherein the alternative resource identifier corresponds to a canonical name (CNAME).

19. The method as recited in claim 11 further comprising prior to obtaining a request from a client computing device for a resource:
- obtaining a domain name system (DNS) query from the client computing device, the DNS query corresponding to the resource; and
- providing an identification of a network storage provider component for providing the requested resource.

20. A method comprising:
- obtaining a domain name system (DNS) query from a client computing device, the DNS query corresponding to a request for a resource;
- updating request processing information based on the DNS query;
- determining one or more delivery costs corresponding to each of one or more content delivery network (CDN) services, wherein each of the one or more CDN service providers is operative to provide resources on behalf of a content provider, wherein the one or more delivery costs correspond to a financial cost incurred by the content provider for providing the requested resource in the future using respective ones of the one or more CDN service providers, and wherein the one or more delivery costs are based on the updated request processing information; and
- providing an alternative resource identifier responsive to the DNS query, the alternative resource identifier associated with a CDN service provider identified as a function of the determined one or more delivery costs corresponding to the CDN service provider.

21. The method as recited in claim 20 further comprising generating an updated recommendation to the content provider regarding use of a CDN service provider as a function of the updated request processing information.

22. The method as recited in claim 21 further comprising:
- obtaining a subsequent DNS query from a client computing device; and
- providing a different alternative resource identifier responsive to the subsequent DNS query, the different alternative resource identifier associated with a CDN service provider identified corresponding to the updated recommendation.

23. The method as recited in claim 20, wherein the alternative resource identifier corresponding to a canonical name (CNAME).

24. The method as recited in claim 20, further comprising:
obtaining a subsequent request from a client computing device for a resource;
processing the subsequent request for the resource, the processing of the subsequent request for the resource including providing the requested resource to the client computing device;
updating the request processing information corresponding to the subsequent request for the resource; and
generating a recommendation to the content provider regarding use of a CDN service provider as a function of the updated request processing information.

25. The method as recited in claim 20, wherein the request processing information includes at least one of a total number of requests obtained from client computing devices for a resource over a defined period of time, trends regarding an increase in requests from client computing devices for the resource, trends regarding a decrease in requests from client computing devices for the resource and a current financial cost associated with the delivery of the resource by storage component.

* * * * *